(12) United States Patent
Kim

(10) Patent No.: US 12,225,257 B2
(45) Date of Patent: Feb. 11, 2025

(54) INPUT DEVICE

(71) Applicant: KYUNG IN ELECTRONICS CO., LTD, Seoul (KR)

(72) Inventor: Bum Seok Kim, Anyang-si (KR)

(73) Assignee: KYUNG IN ELECTRONICS CO., LTD, Seoul (KR)

( * ) Notice: Subject to any disclaimer, the term of this patent is extended or adjusted under 35 U.S.C. 154(b) by 54 days.

(21) Appl. No.: 18/255,579

(22) PCT Filed: Nov. 3, 2021

(86) PCT No.: PCT/KR2021/015766
§ 371 (c)(1),
(2) Date: Jun. 1, 2023

(87) PCT Pub. No.: WO2022/119149
PCT Pub. Date: Jun. 9, 2022

(65) Prior Publication Data
US 2024/0107101 A1    Mar. 28, 2024

(30) Foreign Application Priority Data
Dec. 3, 2020    (KR) .......................... 10-2020-0167116

(51) Int. Cl.
*H04N 21/422*    (2011.01)

(52) U.S. Cl.
CPC .............................. *H04N 21/42206* (2013.01)

(58) Field of Classification Search
CPC ........... H04N 21/422; H04N 21/42206; H04N 21/42212; G06F 3/02; G06F 3/0202; G06F 3/0362
See application file for complete search history.

(56) References Cited

U.S. PATENT DOCUMENTS 5,590,219 A * 12/1996 Gourdol ............. G06V 30/1423
382/187
5,612,719 A *  3/1997 Beernink ............ G06F 3/04883
345/173

(Continued)

FOREIGN PATENT DOCUMENTS

JP       2018-152073 A      9/2018
KR   10-2016-0147578 A     12/2016

(Continued)

OTHER PUBLICATIONS

Office Action for KR 10-2020-0167116 by Korean Intellectual Property Office dated Nov. 22, 2023.

(Continued)

*Primary Examiner* — Michael B. Pierorazio
(74) *Attorney, Agent, or Firm* — BROADVIEW IP LAW, PC

(57) ABSTRACT

Provided is an input device which allows a user to select desired contents more quickly and intuitively in selection of contents. The input device includes: a navigation key manipulated to select one direction among a plurality of directions; a dial unit including a rotating dial wheel; and a control unit which controls movement on a user interface screen of a target device based on one or more direction inputs corresponding to the navigation key and a rotation operation input of the dial wheel, wherein the navigation key and the dial wheel are coupled with each other in a stacked structure.

19 Claims, 15 Drawing Sheets

(56) References Cited

U.S. PATENT DOCUMENTS

| | | | | |
|---|---|---|---|---|
| 6,421,067 B1* | 7/2002 | Kamen | H04N 21/4316 | 348/E5.103 |
| 6,868,551 B1* | 3/2005 | Lawler | H04N 21/4821 | 725/43 |
| 7,046,230 B2* | 5/2006 | Zadesky | G06F 1/1626 | 345/173 |
| 7,345,671 B2* | 3/2008 | Robbin | G06F 3/0482 | 345/173 |
| 7,373,650 B1* | 5/2008 | Rodriguez | H04N 21/42676 | 348/565 |
| 7,493,639 B2* | 2/2009 | Lawler | H04N 21/8133 | 725/39 |
| 7,574,672 B2* | 8/2009 | Jobs | G06F 3/04817 | 715/810 |
| 7,610,555 B2* | 10/2009 | Klein | H04N 21/47 | 715/740 |
| 7,667,148 B2* | 2/2010 | Mansfield | G06F 3/0236 | 345/184 |
| 7,853,973 B2* | 12/2010 | Chung | H04N 21/4314 | 725/135 |
| 7,877,705 B2* | 1/2011 | Chambers | G06F 3/04883 | 715/833 |
| 8,285,334 B2* | 10/2012 | Choi | H04N 21/414 | 725/135 |
| 8,302,127 B2* | 10/2012 | Klarfeld | H04N 21/4751 | 705/14.66 |
| 8,850,478 B2* | 9/2014 | Moshiri | H04N 5/782 | 725/39 |
| 8,904,438 B2* | 12/2014 | Kang | H04N 21/482 | 725/43 |
| 2003/0076306 A1* | 4/2003 | Zadesky | G06F 3/0362 | 345/173 |
| 2003/0095096 A1* | 5/2003 | Robbin | G06F 3/0482 | 345/156 |
| 2003/0117427 A1* | 6/2003 | Haughawout | H04N 21/4222 | 715/710 |
| 2004/0261038 A1* | 12/2004 | Ording | G06F 3/0481 | 715/788 |
| 2005/0060138 A1* | 3/2005 | Wang | G06F 40/289 | 704/1 |
| 2005/0108751 A1* | 5/2005 | Dacosta | H04N 21/4135 | 348/E5.103 |
| 2005/0235321 A1* | 10/2005 | Ahmad-Taylor | H04N 21/47214 | 725/39 |
| 2005/0251821 A1* | 11/2005 | Pina | H04N 21/84 | 725/39 |
| 2007/0124792 A1* | 5/2007 | Bennett | H04N 7/17318 | 348/E7.071 |
| 2007/0139386 A1* | 6/2007 | Martin | G06F 3/04886 | 345/173 |
| 2007/0152979 A1* | 7/2007 | Jobs | G06F 3/04817 | 345/173 |
| 2007/0165964 A1* | 7/2007 | Wolf | G06F 3/048 | 382/276 |
| 2007/0290990 A1* | 12/2007 | Robbin | G06F 3/03543 | 345/156 |
| 2008/0087476 A1* | 4/2008 | Prest | G06F 3/03547 | 178/18.01 |
| 2008/0088582 A1* | 4/2008 | Prest | H01H 25/041 | 345/156 |
| 2008/0088596 A1* | 4/2008 | Prest | H01H 25/041 | 345/173 |
| 2008/0165141 A1* | 7/2008 | Christie | G06F 3/0482 | 345/173 |
| 2008/0276168 A1* | 11/2008 | Mansfield | H04M 1/233 | 715/702 |
| 2009/0144768 A1* | 6/2009 | Nagaraja | H04N 21/222 | 725/39 |
| 2010/0238109 A1* | 9/2010 | Cook | H04N 7/17318 | 345/173 |
| 2011/0037851 A1* | 2/2011 | Kim | G08C 23/04 | 348/143 |
| 2011/0085526 A1* | 4/2011 | Joseph | H04M 1/72415 | 455/556.1 |
| 2011/0202960 A1* | 8/2011 | Vaysman | H04N 21/4316 | 725/41 |
| 2011/0283189 A1* | 11/2011 | McCarty | H04N 21/4532 | 715/810 |
| 2011/0302610 A1* | 12/2011 | Karaoguz | H04L 67/10 | 725/46 |
| 2011/0321094 A1* | 12/2011 | Kuo | G06F 3/0481 | 725/39 |
| 2012/0131496 A1* | 5/2012 | Goossens | G06F 9/451 | 715/788 |
| 2012/0151525 A1* | 6/2012 | Demchenko | H04N 21/42208 | 345/173 |
| 2012/0224834 A1* | 9/2012 | Chen | H04N 5/782 | 386/292 |
| 2012/0246679 A1* | 9/2012 | Chen | H04N 21/4788 | 725/38 |
| 2012/0278825 A1* | 11/2012 | Tran | G06Q 30/04 | 725/13 |
| 2012/0284753 A1* | 11/2012 | Roberts | G06F 3/0488 | 725/47 |
| 2012/0286977 A1* | 11/2012 | Yamazaki | H01H 25/04 | 341/35 |
| 2012/0303476 A1* | 11/2012 | Krzyzanowski | G06F 16/00 | 705/26.61 |
| 2012/0306929 A1* | 12/2012 | Chalkov | G06F 3/0488 | 345/173 |
| 2012/0311444 A1* | 12/2012 | Chaudhri | G11B 27/34 | 715/716 |
| 2012/0311634 A1* | 12/2012 | VanDuyn | H04N 21/4314 | 725/40 |
| 2016/0112737 A1* | 4/2016 | Johnston | H04N 21/25891 | 725/14 |
| 2019/0146546 A1* | 5/2019 | Goto | G06F 3/0362 | 345/184 |
| 2020/0150766 A1* | 5/2020 | Bagley | B60K 35/00 | |
| 2021/0057175 A1* | 2/2021 | Kim | H03K 17/962 | |

FOREIGN PATENT DOCUMENTS

| | | |
|---|---|---|
| KR | 10-2017-0132693 A | 12/2017 |
| KR | 10-1845975 B1 | 5/2018 |
| KR | 10-1992182 B1 | 6/2019 |

OTHER PUBLICATIONS

International Search Report for PCT/KR2021/015766 by Korean Intellectual Property Office dated Feb. 7, 2022.

* cited by examiner

INPUT DEVICE

CROSS-REFERENCE TO RELATED APPLICATIONS

This application is a National Phase Entry Application of PCT Application No. PCT/KR2021/015766, filed on Nov. 3, 2021, which claims priority to Korean Patent Application No. 10-2020-0167116, filed on Dec. 3, 2020, in Korean Intellectual Property Office, the entire contents of which are hereby incorporated by reference in its entirety.

TECHNICAL FIELD

The present invention relates to an input device, and more specifically, to an input device such as a remote controller adopted to an A/V device such as a TV set.

BACKGROUND ART

As the number of contents provided by various broadcasting and media platforms continues to increase, there is a trend towards presenting diverse contents on a single screen interface (e.g., Netflix content screen, YouTube content screen, and the like) to facilitate user content selection.

For instance, as illustrated in FIGS. 1 or 2, an input device (e.g., a remote controller 20 or 30) uses a specific communication method (e.g., an IR communication method, or an RF wireless communication method such as Bluetooth, Zigbee, or the like) to control an A/V device 10, such as a TV set or the like, directly and remotely or to control the A/V device 10 through a set-top box (not shown) connected to the A/V device 10 remotely.

FIG. 1 is a diagram illustrating an example of a conventional media content selection control method, depicting a case in which a user wants to find desired media contents on a user interface screen 12 of a conventional A/V device 10. Conventionally, when a user selects desired media contents on the user interface screen 12, the user had to manually click on a left key 22c, a right key 22d, an up key 22a, and a down key 22b with the user's finger to find the desired media content.

FIG. 2 is a diagram illustrating an example of a conventional video media frame selection control method, depicting a case in which a user wants to find a desired video frame while watching video media. Conventionally, in a case in which a user wants to find a desired video frame while watching video media, the user had to manually click on a rewind key 32a or a fast-forward key 32b with the user's finger one by one to search for the desired video frame.

As described above, the conventional input devices (e.g., remote controllers) used for controlling media contents employ navigation key (e.g., a left key 22c, a right key 22d, an up key 22a, a down key 22b, a rewind key 32a, fast-forward key 32b, etc.) for selection.

However, as mentioned above, in the conventional method, users had to press each navigation key one by one to search for and select desired contents, so it takes too much time to find desired contents or it is inconvenient. For example, even if the user operates the left key 22c or right key 22d as quickly as possible, it is difficult to achieve a speed of approximately 108 milliseconds (presses nine times per second) or higher when using IR communication.

DISCLOSURE

Technical Problem

Accordingly, the present invention has been made in view of the above-mentioned problems occurring in the related art, and it is an object of the present invention to provide an input device, such as a remote controller, which allows a user to select desired contents more quickly and intuitively in selection of contents.

Technical Solution

To accomplish the above-mentioned objects, according to the present invention, there is provided an input device including: a navigation key manipulated to select one direction among a plurality of directions; a dial unit including a rotating dial wheel; and a control unit which controls movement on a user interface screen of a target device based on one or more direction inputs corresponding to the navigation key and a rotation operation input of the dial wheel, wherein the navigation key and the dial wheel are coupled with each other in a stacked structure.

The control unit controls selection movement between media contents aligned in rows or columns on the user interface screen based on at least one among one or more direction inputs corresponding to the navigation key and the rotation operation input of the dial wheel.

The control unit transmits remote control signals to the target device in an input cycle corresponding to the rotational speed of the dial wheel, and scrolls media contents aligned in rows or columns on the user interface screen at a speed corresponding to the input cycle with respect to the rotational direction of the dial wheel.

The control unit transmits remote control signals to the target device in an input cycle corresponding to the rotational speed of the dial wheel, and moves a playback position of a video frame at a speed corresponding to the input cycle with respect to the rotational direction of the dial wheel.

The control unit further controls the row movement or the column movement of the media contents in the matrix structure on the user interface screen based solely on the direction selected by the navigation key, independently from the rotation input of the dial wheel.

The dial unit includes: a dial tooth wheel which is installed on one side of the main PCB assembly where a plurality of first switches for direction detection are installed around a first hole, and which has a second hole and a plurality of gear teeth formed on the outer surface thereof; a dial body which has a third hole and a first insertion hole formed around the third hole; and the dial wheel which has a fourth hole and which is coupled with the navigation key through a first coupling member, wherein the dial body, the navigation key, and the dial wheel are stacked on a cover body installed on the other side of the main PCB assembly by the medium of a key pad having a plurality of actuators formed around a fifth hole.

The cover body includes a storage space in which the dial body, the navigation key, and the dial wheel are stacked, and the storage space has a sixth hole formed in the center, and a seating portion formed adjacent to the edge of the sixth hole, and a second insertion hole which is formed around the seating portion for inserting the actuators thereinto, wherein the seating portion is stepped so as to be located lower than the portion where the second insertion hole is formed The dial body is seated on the seating portion, the navigation key is stored in the portion where the second insertion hole is formed, and the dial wheel is stacked on the upper portion of the navigation key.

The navigation key includes a seventh hole formed, an eighth hole formed around the seventh hole for coupling with the first coupling member of the dial wheel, a second coupling member formed on one side to be coupled to the first insertion hole of the dial body, and a rail formed on the one side to get in contact with the actuator exposed through the second insertion hole of the cover body.

When a portion representing a specific direction on the dial wheel is pressed, the rail operates the actuator corresponding to the pressed portion, and the operated actuator actuates the switch responsible for the corresponding direction among the plurality of first switches.

The rail protrudes in a ring shape, and rotates along with the actuator exposed through the second insertion hole depending on the rotation of the dial wheel.

The input device further includes a subsidiary PCB assembly which is coupled to one side of the main PCB assembly through the dial tooth wheel, and has a second switch formed on one side and a third insertion hole formed around the second switch.

The input device further includes an OK key, wherein the OK key is coupled to the third insertion hole of the subsidiary PCB assembly through the first to seventh holes, and is installed to get in contact with the second switch.

The first switch is a plurality of switches formed around the ninth hole of the main PCB assembly to be spaced apart from each other, and the plurality of switches and the plurality of actuators face each other one to one to get in mutual contact with each other.

The dial tooth wheel is coupled to the dial body through the ninth hole, the sixth hole, and the fifth hole.

The input device further includes a detection switch which detects the rotational speed of the dial wheel by performing continuous contact and contact release with the plurality of gear teeth depending on the rotation of the dial tooth wheel.

In another aspect of the present invention, there is provided an input device including: a navigation key manipulated to select one direction among a plurality of directions; and a dial unit including a rotating dial wheel, wherein the dial unit includes: a dial tooth wheel which is installed on one side of the main PCB assembly where a plurality of first switches for direction detection are installed around a first hole, and which has a second hole and a plurality of gear teeth formed on the outer surface thereof; a dial body which has a third hole and a first insertion hole formed around the third hole; and the dial wheel which has a fourth hole and which is coupled with the navigation key through a first coupling member. The dial body, the navigation key, and the dial wheel are stacked on a cover body installed on the other side of the main PCB assembly by the medium of a key pad having a plurality of actuators formed around a fifth hole.

Advantageous Effects

The output device according to the configuration of the present invention allows a user to select the navigation key operation or the dial wheel operation according to the user convenience since having the navigation key operation and dial wheel operation which are performed together.

The media content selection is faster and more intuitive than the conventional navigation key.

The output device allows the user to control the rewinding (REW) and fast-forwarding (FF) functions quickly and intuitively while watching video media.

MODE FOR INVENTION

Figure 1:
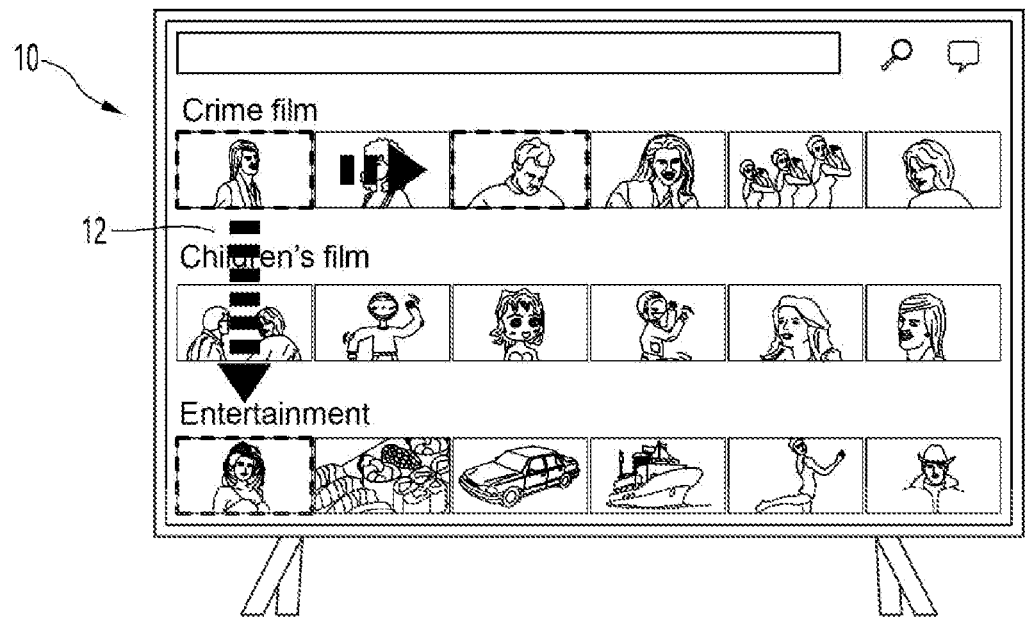
FIG. 1 is a diagram illustrating an example of a conventional media content selection control method.
Figure 1:
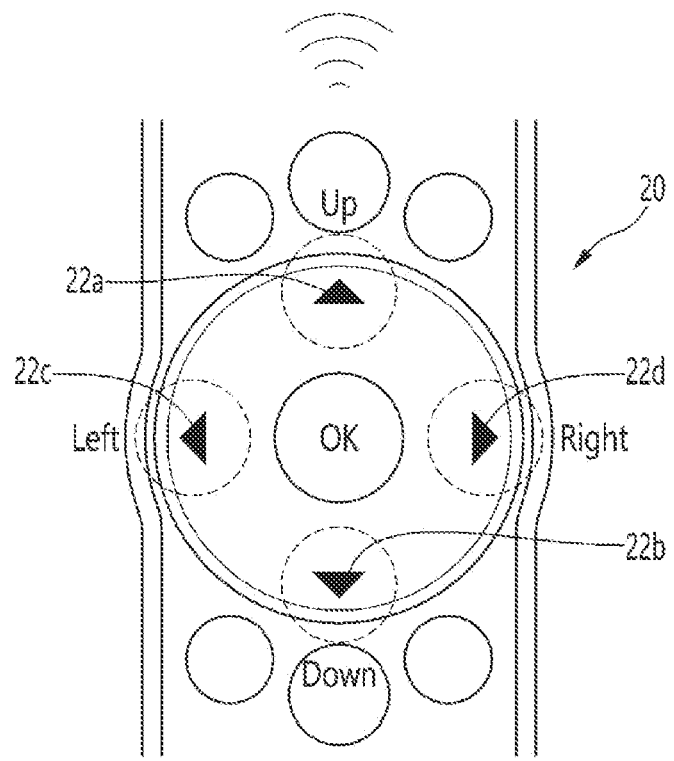
Figure 2:
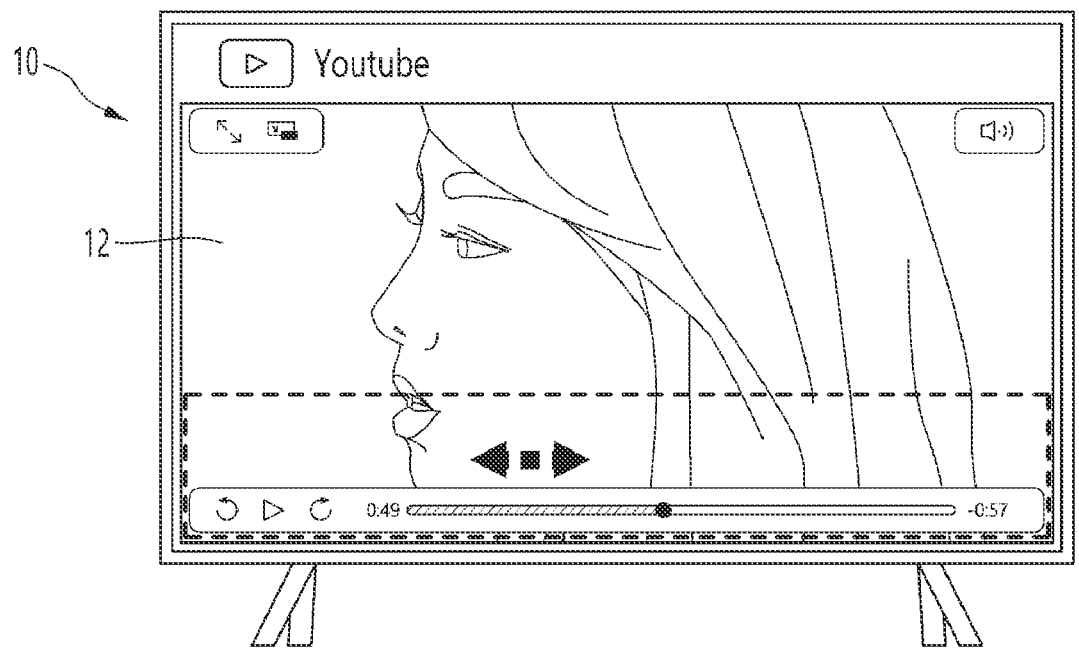
FIG. 2 is a diagram illustrating an example of a conventional video media frame selection control method.
Figure 2:
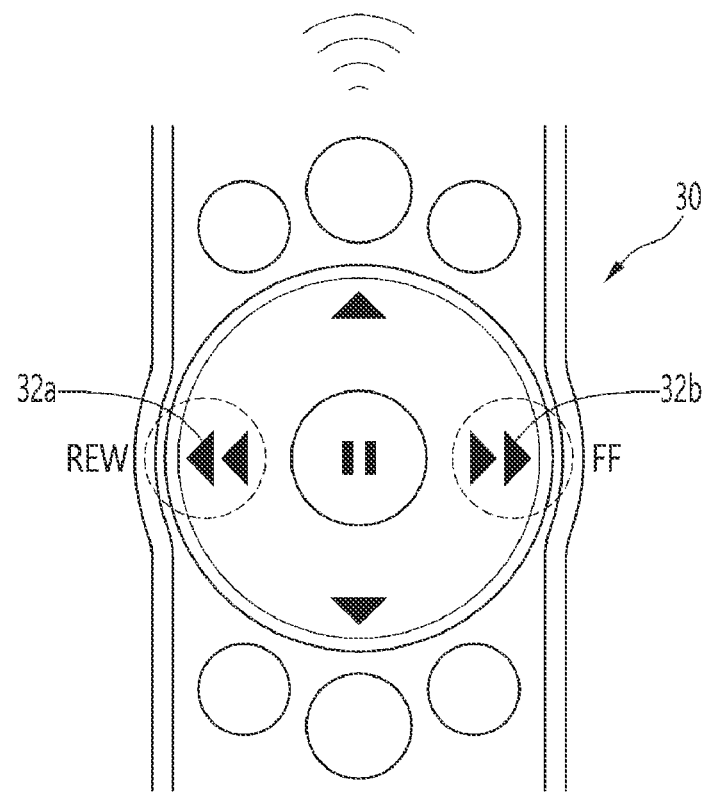

The invention may be modified in various forms and may have various embodiments. Specific embodiments will be illustrated in the drawings and described in detail.

However, the embodiments are not intended to limit the invention, but it should be understood that the invention includes all modifications, equivalents, and replacements belonging to the concept and the technical scope of the invention.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

Unless otherwise defined, all technical or scientific terms used herein have the same meaning as commonly understood by those skilled in the art to which the present invention belongs. Terms that are defined in standard dictionaries and have meanings consistent with the meanings in the context of the relevant art should be interpreted in a manner consistent with the context of the relevant technology. Unless explicitly defined in this application, terms should not be interpreted in an idealized or overly formal sense.

Hereinafter, with reference to the accompanying drawings, preferred embodiments of the present invention will be described in detail. To facilitate overall understanding in describing the present invention, the same reference numerals are used for the same components in the drawings, and redundant descriptions of the same components are omitted.

Figure 3:
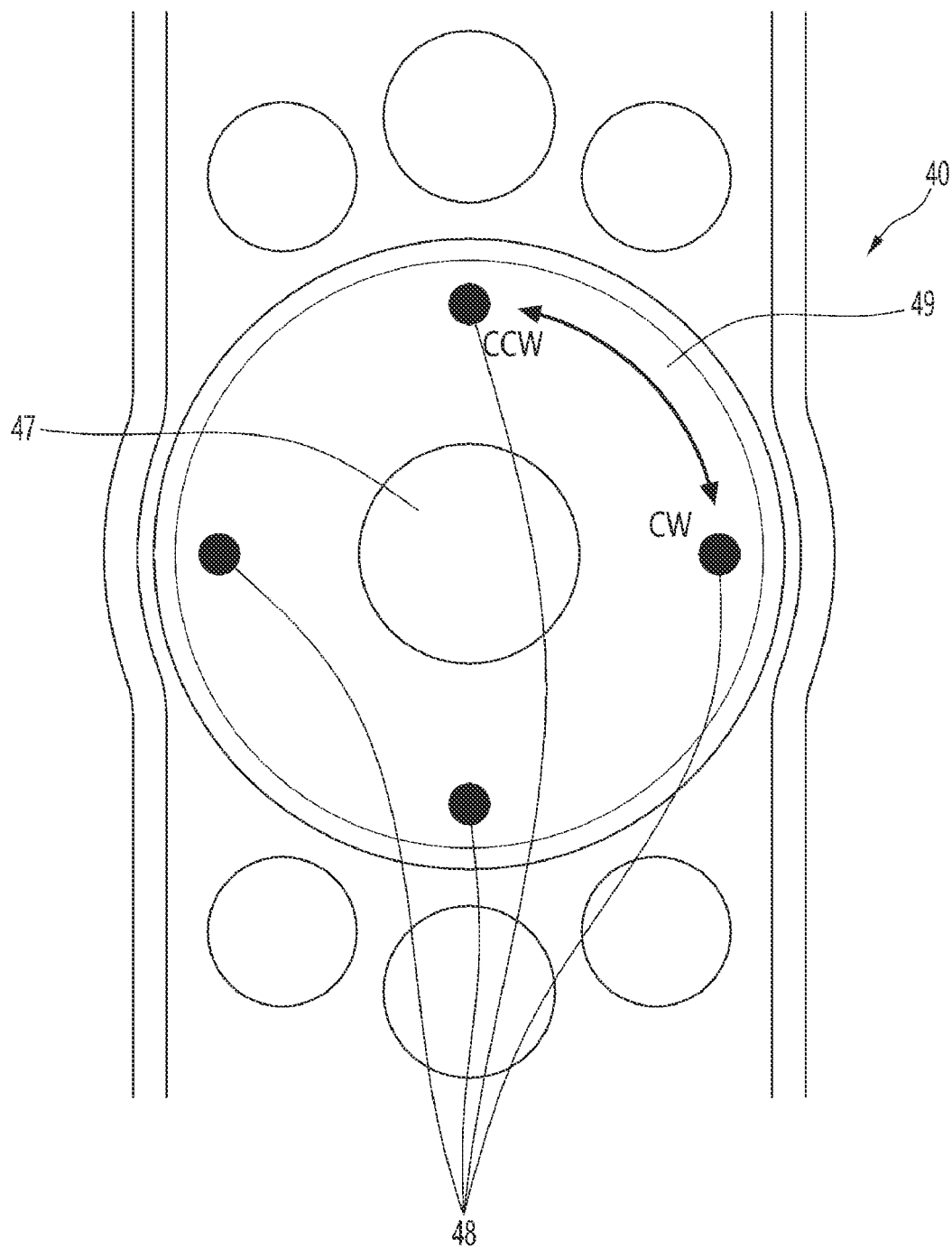
FIG. 3 is a diagram depicting the external appearance of essential parts of an input device according to an embodiment of the present invention.
Figure 4:
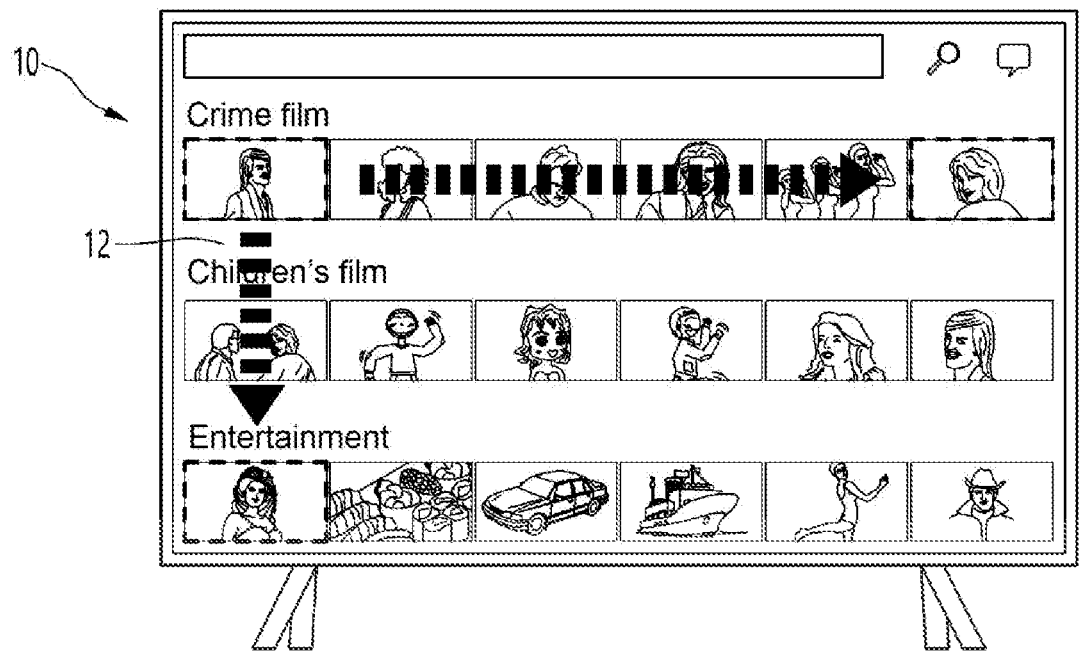
FIG. 4 is a diagram illustrating a case in which the input device according to an embodiment of the present invention performs a media content selection control.
Figure 4:
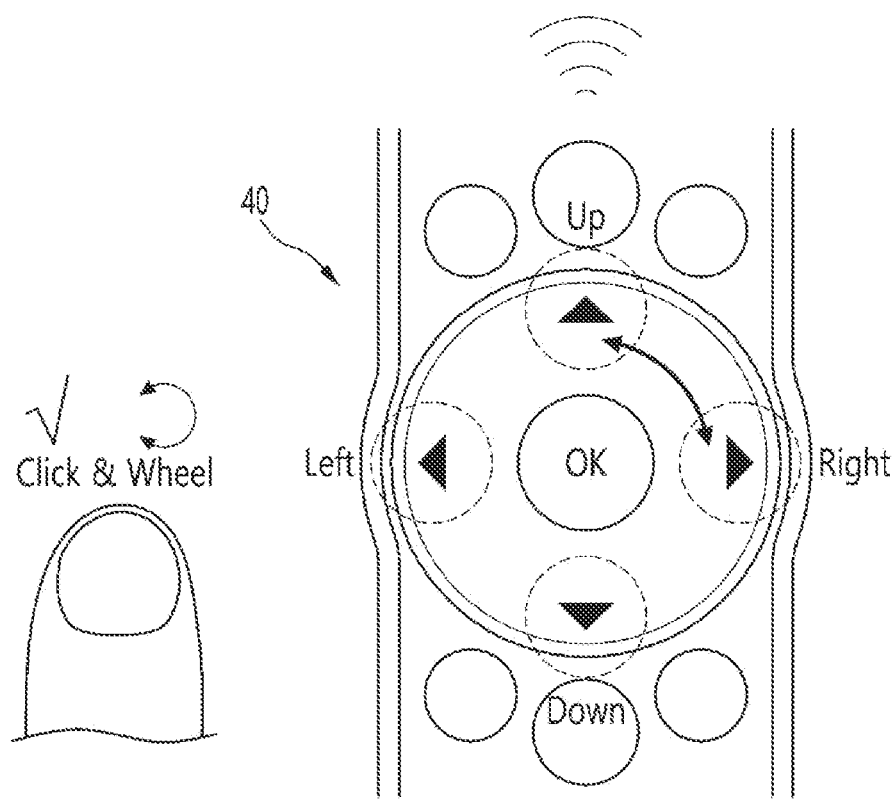
Figure 5:
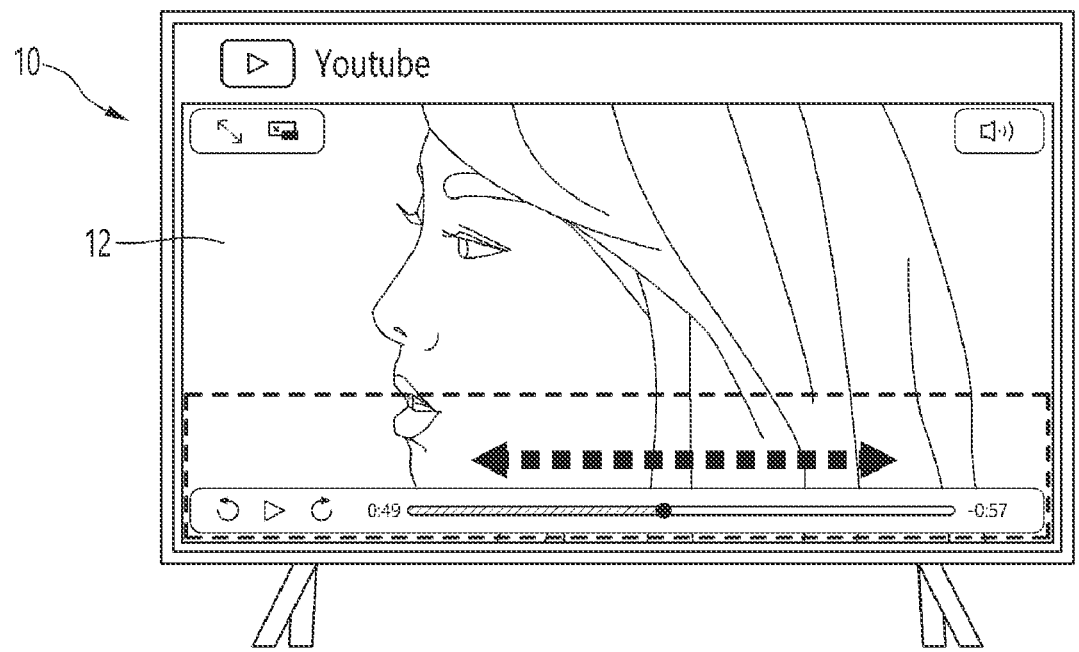
FIG. 5 is a diagram illustrating a case in which the input device according to an embodiment of the present invention performs a video media frame selection control.
Figure 5:
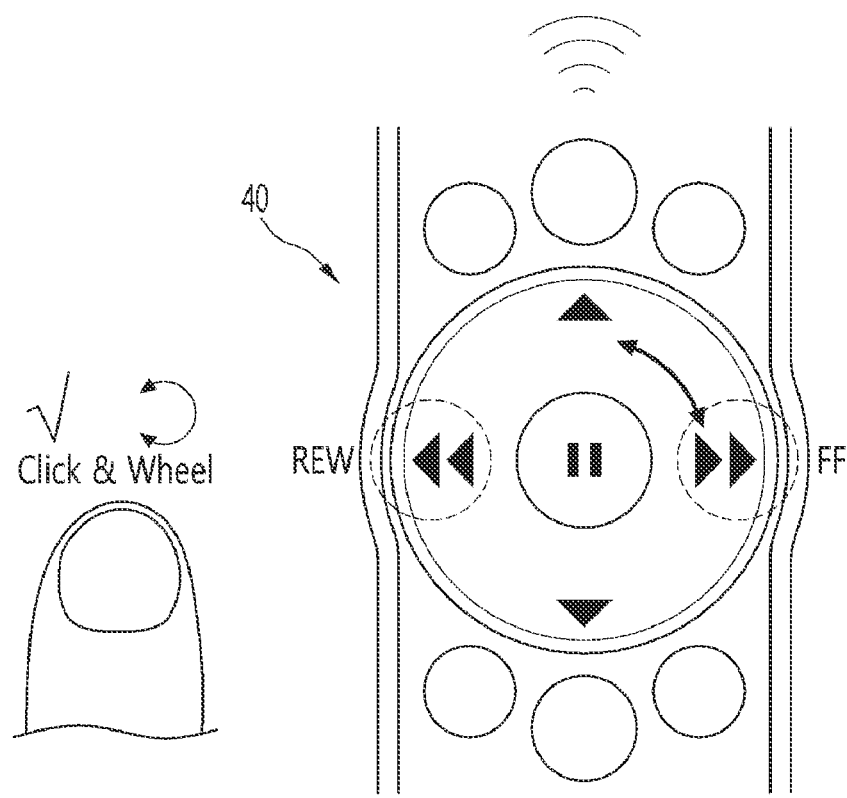

FIG. 3 is a diagram depicting the external appearance of essential parts of an input device according to an embodiment of the present invention, FIG. 4 is a diagram illustrating a case in which the input device according to an embodiment of the present invention performs a media content selection control, and FIG. 5 is a diagram illustrating a case in which the input device according to an embodiment of the present invention performs a video media frame selection control.

The input device according to an embodiment of the present invention may include various devices for transmitting input signals to a remotely controlled target device, and a preferred embodiment may include a remote controller 40.

The input device according to an embodiment of the present invention (e.g., a remote controller 40) includes an OK key 47, a navigation key 48, and a dial wheel 49.

The OK key 47 is installed on the top surface of the remote controller 40, and may be in the form of a push button.

The OK key 47 may perform a confirmation function by user operation.

In FIG. 3, the navigation key 48 and the dial wheel 49 are formed to surround the OK key 47, but the OK key 47 operates independently from the navigation key 48 and the dial wheel 49.

The dial wheel 49 may rotate in either clockwise (CW) or counterclockwise (CCW) direction by user operation. In other words, a user may freely rotate the dial wheel 49 in the clockwise direction or in the counterclockwise direction by placing a finger on the dial wheel.

The OK key 47 may be installed separately from the dial wheel 49 at the center of the dial wheel 49. Accordingly, the OK key 47 may move vertically by the user's push operation.

The navigation key 48 is operated when the user wants to select a direction among the four directions (e.g., up, down, left, right).

In FIG. 3, the navigation key 48 is illustrated like a protrusion, but may not be actually seen with the naked eyes since being installed underneath the dial wheel 49.

In particular, in FIG. 3, four points indicated by guide lines as the navigation key 48 do not represent the navigation key but rather indicate points corresponding to the four directions (e.g., up, down, left, right) selectable by the user. Therefore, when the user presses any one among the four points indicated as the navigation key 48 (i.e., when the user presses any one of the four points on the dial wheel 49), the dial key may operate in the direction corresponding to the direction pressed by the user among the four directions.

Since the dial wheel 49 is directly coupled to the navigation key 48, the dial wheel 49 may not only rotate in the clockwise direction or in the counterclockwise direction but also select any direction among the four directions. In other words, the dial wheel 49 combined with the navigation key 48 has both rotation and direction selection functions.

The input device (e.g., a remote controller 40) according to an embodiment of the present invention, as illustrated in FIGS. 4 and 5, may communicate with an A/V device 10 or a set-top box (not shown) connected to the A/V device 10 through various communication methods (e.g., IR communication, RF wireless communication, such as Bluetooth, Zigbee, or the like).

For example, in a case in which media contents are provided from the A/V device 10, the input device according to an embodiment of the present invention, such as the remote controller 40, may control the media contents directly through IR or RF communication.

On the other hand, when connected to a set-top box and an A/V device 10, the input device (e.g., the remote controller 40) according to an embodiment of the present invention may control the media content of the set-top box (omitted in the description) directly through IR or RF communication.

The input device (e.g., the remote controller 40) according to an embodiment of the present invention has a structure capable of simultaneously performing a direction (e.g., up, down, left, right) selection function and a wheel function.

If only the wheel function is available, the user interface (UI) should be implemented in software to automatically move to the next row's media content when scrolling at the final media content in order to move to the next row's media content after scrolling up to the last one through all media contents aligned in one row.

However, the input device (e.g., the remote controller 40) according to an embodiment of the present invention may operate the up key and the down key of the navigation key 48 separately from the wheel function since the dial wheel 49 and navigation key 48 are combined to move together. As a result, the remote controller 40 can control fast, free, and intuitive movement to the media content arranged in the next row since the movement in both row and column directions is performed naturally without requiring additional software implementation.

In other words, conventionally, when a user selected media content on a user interface screen 12, the user had to click the left/right keys one by one to find a desired media content. However, the input device (e.g., the remote controller 40) according to an embodiment of the present invention, as illustrated in FIG. 4, allows the user to quickly and accurately move the aligned media contents in one row to the left or right to find the desired media content to watch more quickly by rotating the dial wheel 49 (i.e., using the wheel function). Moreover, the input device (e.g., the remote controller 40) according to an embodiment of the present invention allows the user to press the position corresponding to the up or down point among the four points of the dial wheel 49 to initiate the movement to the next row's media contents.

Meanwhile, conventionally, when a user wanted to find a desired video frame while watching video media, the user had to click a rewind key or a fast-forward key one by one with the finger to find the desired video frame. However, the input device (e.g., the remote controller 40) according to an embodiment of the present invention, as illustrated in FIG. 5 may allow the user to quickly and accurately move the playback position of the video frame to the left or right to find the desired video frame to watch more quickly and accurately by rotating the dial wheel 49 (i.e., using the wheel function). Of course, the input device (e.g., the remote controller 40) according to an embodiment of the present invention may allow the user to click the rewind key (or left key) or the fast-forward key (or right key) one by one to find the desired video frame.

In conclusion, the input device according to the exemplary embodiment of the present invention described above enables faster and more intuitive selection of desired media contents or video frames to enhance user convenience.

Figure 6:
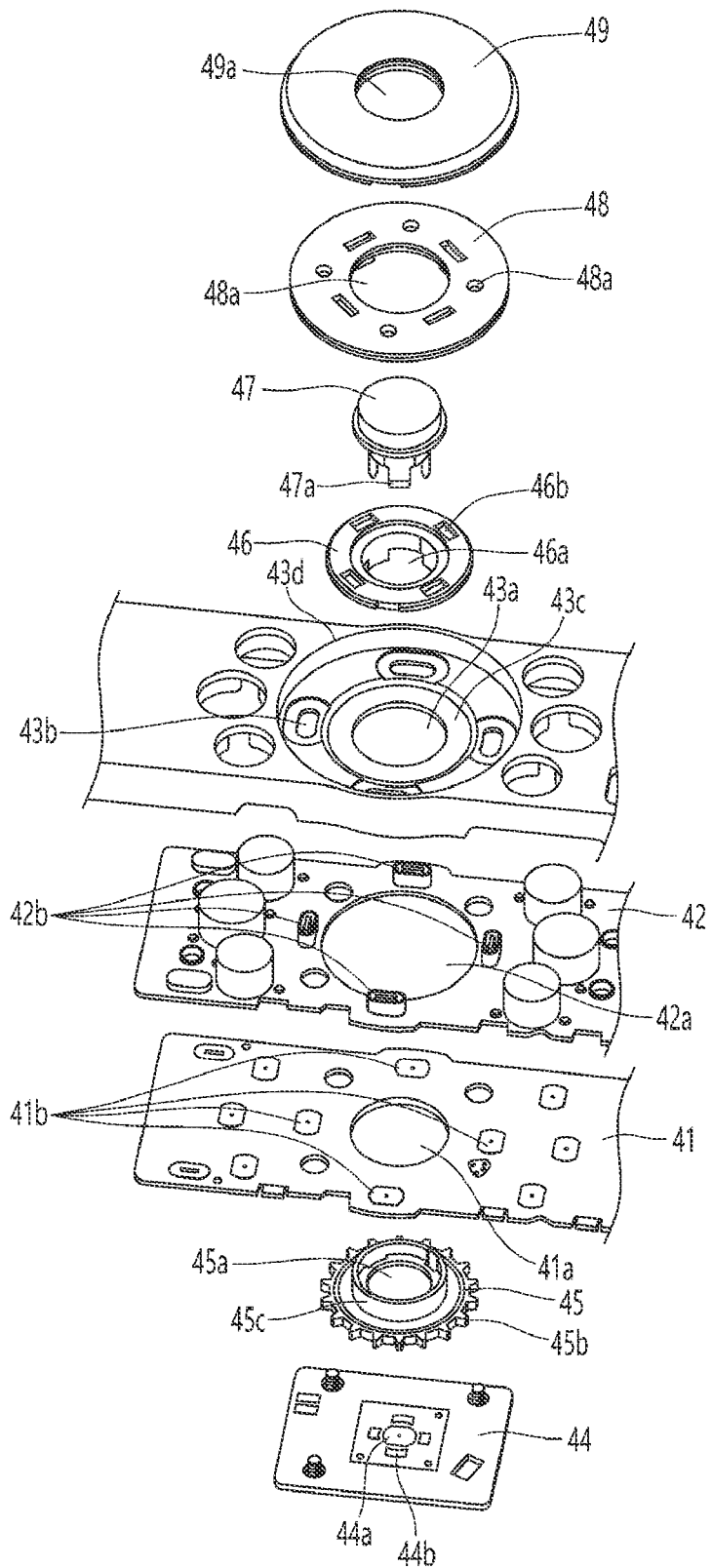
FIG. 6 is an exploded perspective view of the input device according to an embodiment of the present invention.
Figure 7:
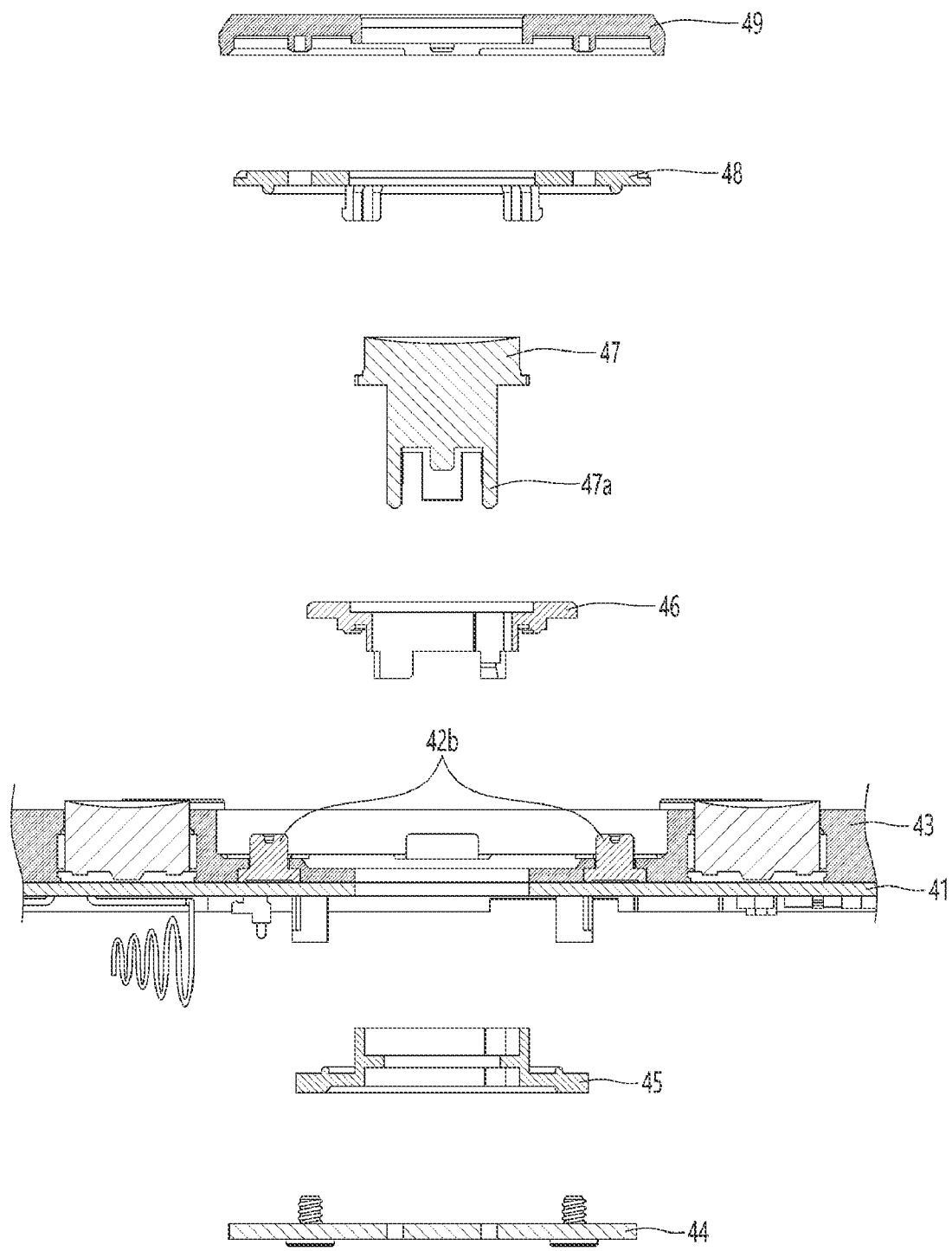
FIG. 7 is an exploded sectional view of the input device according to an embodiment of the present invention.
Figure 8:
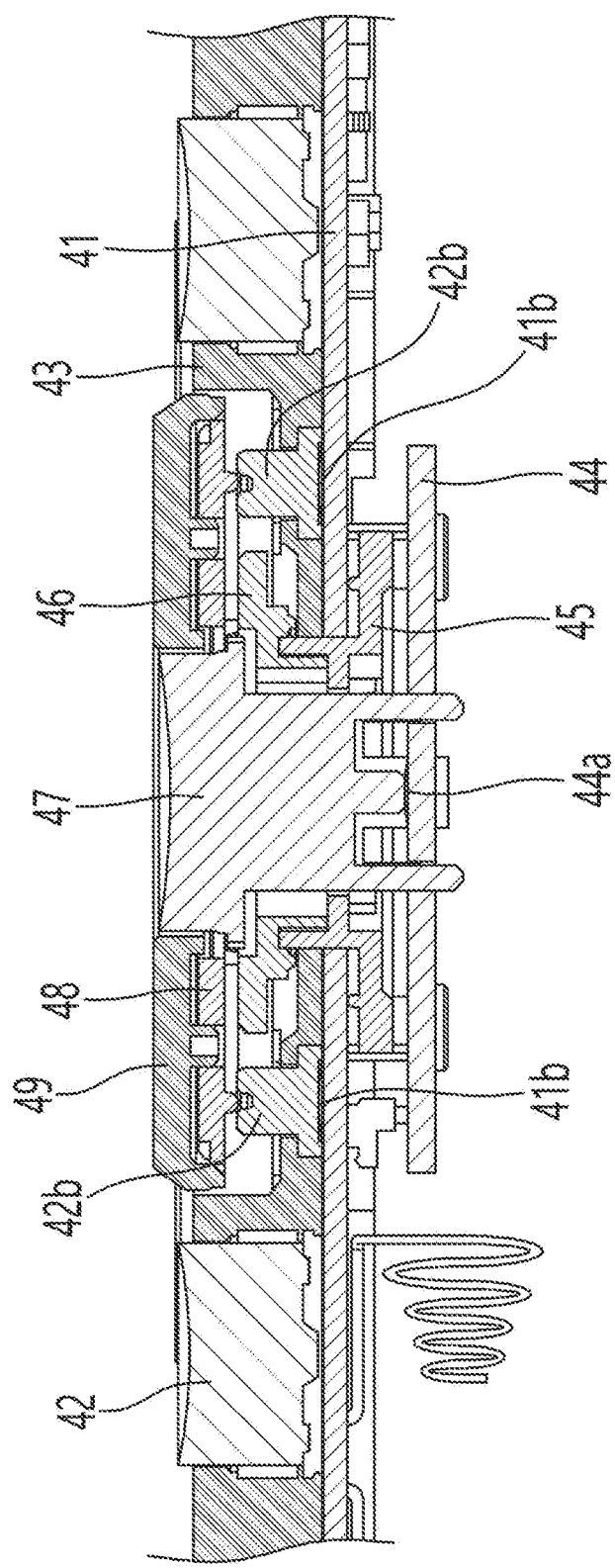
FIG. 8 is a sectional view illustrating an assembled state of the input device according to an embodiment of the present invention.

FIG. 6 is an exploded perspective view of the input device according to an embodiment of the present invention, FIG. 7 is an exploded sectional view of the input device according to an embodiment of the present invention, and FIG. 8 is a sectional view illustrating an assembled state of the input device according to an embodiment of the present invention.

The the input device (e.g., the remote controller 40) according to an embodiment of the present invention includes a main PCB assembly 41.

A cover body 43 is positioned on one side (e.g., the top side) of the main PCB assembly 41, and a keypad 42 made of an insulating material (e.g., rubber, etc.) is interposed between the main PCB assembly 41 and the cover body 43.

A circular hole 41*a* is formed in the center of the main PCB assembly 41, and a plurality of switches 41*b* are installed around the hole 41*a* to be spaced apart from each other.

A circular hole 42*a* which is larger than the circular hole 41*a* is perforated in the center of the keypad 42. The hole 42*a* may face the hole 41*a*. In the meantime, a plurality of actuators 42*b* surrounded by an insulating material (e.g., rubber, etc.) are installed around the hole 42*a* of the keypad 42 to be spaced apart from each other. Furthermore, the hole 42*a* faces also a hole 43*a* of the cover body 43.

The plurality of actuators 42*b* are installed at positions facing the plurality of switches 41*b*, and the lower surface of each actuator 42*b* faces to get in contact with the corresponding switch 41*b*. Here, there are four switches 41*b* and four actuators 42*b*, and the switches 41*b* and actuators 42*b* facing each other may be installed in the positions corresponding to left, right, up, and down. The plurality of switches 41*b* may be referred to as direction-detection switches.

The cover body 43 includes a storage space 43*d* capable of accommodating a dial body 46, the navigation key 48, and the dial wheel 49.

The circular hole 43*a* is formed in the center of the storage space 43*d* to have a diameter approximately equal to the diameter of the hole 41*a*, a seating portion 43*c* with a certain width is formed adjacent to the edge of the hole 43*a*, and actuator insertion holes 43*b* into which the actuators 42*b* are respectively inserted are formed around the seating portion 43*c*.

When the cover body 43 is positioned on one side (e.g., the top side) of the main PCB assembly 41 by the medium of the keypad 42, the actuators 42*b* of the keypad 42 are inserted into the actuator insertion holes 43*b*, and a portion (e.g., the upper portion) of the exposed actuator 42*b* protrudes upward through the actuator insertion hole 43*b*. The upper portion of the exposed actuator 42*b* comes into contact with the protrusion-shaped rail (not shown) of the bottom surface of the navigation key 48.

In other words, the storage space 43*d* has a hole 43*a* formed in the center and a stepped portion. The dial body 46 is seated on the seating portion 43*c* of the storage space 43*d*, the navigation key 48 is stored in the portion where the actuator insertion hole 43*b* is formed, and the dial wheel 49 is stored on the upper portion of the navigation key 48. Here, the storage space 43*d* is stepped such that the seating portion 43*c* is located lower than the portion where the actuator insertion hole 43*b* is formed. As described above, the storage space 43*d* is stepped to accommodate the dial body 46, the navigation key 48, and the dial wheel 49, thereby reducing the thickness of the remote controller as described later.

A subsidiary PCB assembly 44 is located on the other side (for instance, the bottom side) of the main PCB assembly 41, and a dial tooth wheel 45 is interposed between the main PCB assembly 41 and the subsidiary PCB assembly 44.

A switch 44*a* is formed on one side of the subsidiary PCB assembly 44, namely, on the side facing the main PCB assembly 41, and one or more insertion holes 44*b* are formed around the switch 44*a*. Here, the switches 44*a* come into contact with the OK key 47. For example, the switch 44*a* may be formed in a dome shape.

Of course, the switch 44*a* may be of any form as long as the switch may detect the operation of the KY key 47 besides the dome shape.

A circular hole 45*a* is formed in the center of the dial tooth wheel 45 to be slightly smaller in diameter than the holes 41*a* and 43*a*. Along the edge of the hole 45*a*, a ring-shaped protrusion 45*c* protrudes in one direction (i.e., toward the main PCB assembly 41).

The protrusion 45*c* may be coupled to the dial body 46 through the hole 41*a* of the main PCB assembly 41, the hole 42*a* of the keypad 42, and the hole 43*a* of the cover body 43. In this case, the protrusion 45*c* may be inserted into a circular groove on the bottom surface of the dial body 46 while getting in contact with the inner surface of the holes 41*a* and 43*a*. Although a reference numeral is not indicated for the circular groove on the bottom surface of the dial body 46, it may be easily understood from FIG. 8 that the protrusion 45*c* is inserted into the circular groove on the bottom surface of the dial body 46.

Furthermore, on the outer surface of the dial tooth wheel 45, a plurality of gear teeth 45*b* are formed at uniform intervals.

Meanwhile, the circular dial body 46 is seated on the seating portion 43*c* of the cover body 43.

A perforated hole 46*a* is formed in the center of the dial body 46, and one or more insertion holes 46*b* are formed around the hole 46*a*.

The OK key 47 is inserted into the hole 46*a* of the dial body 46.

In other words, a protrusion pin 47*a* is formed on the lower portion of the OK key 47, and the protrusion pin 47*a* is inserted into the insertion hole 44*b* of the subsidiary PCB assembly 44 through the hole 46*a* of the dial body 46, the hole 43*a* of the cover body 43, the hole 42*a* of the keypad 42, the hole 41*a* of the main PCB assembly 41, and the hole 45*a* of the dial tooth wheel 45.

Meanwhile, it is preferable for the bottom of the protrusion pin 47*a* to be formed in a hook shape. As described above, if the bottom of the protrusion pin 47*a* is formed in the hook shape, it is prevented that the protrusion pin 47*a* is separated from the insertion hole 44*b* even after being inserted into the insertion hole 44*b*.

The dial body 46 is coupled to the navigation key 48, and a coupling protrusion (not shown) of the bottom surface of the navigation key 48 is coupled to the insertion hole 46*b* of the dial body 46.

A circular hole 48*a* is formed in the center of the navigation key 48, and a hole 48*d* for coupling with the dial wheel 49 is formed around the hole 48*a*.

A circular hole 49*a* is formed in the center of the dial wheel 49, and a protrusion (not shown) for coupling with the navigation key 48 is formed on the bottom surface of the dial wheel 49.

In the exemplary embodiment of the present invention configured as described above, the dial wheel 49 is not completely stored in the storage space 43*d* of the cover body 43, but the upper portion of the dial wheel 49 is slightly protruded when stored, as illustrated in FIG. 8. This is to provide convenience in user operation (e.g., clicking or rotating).

In particular, in the exemplary embodiment of the present invention, when the navigation key 48 and the dial wheel 49 are coupled with each other, since the user cannot see the navigation key 8 with the naked eyes, the user manipulates the dial wheel 49 to rotate the dial wheel 49 and select one of the four directions (click). Moreover, since the dial wheel 49, the navigation key 48, the dial body 46, the actuators 42b, the main PCB assembly 41, and the dial tooth wheel 45 are interconnected, the rotation and four-direction selection of the dial wheel 49 may be detected as electrical signals.

Furthermore, in the exemplary embodiment of the present invention, the OK key 47 may operate independently from the dial wheel 49. In other words, the OK key 47 operates the switch 44a of the subsidiary PCB assembly 44 located below through the perforated circular holes 46a, 43a, 42a, 41a, and 45a.

The exemplary embodiment of the present invention, as described above, may have a stacked structure in order to prevent an increase in the thickness of the input device (e.g., remote controller 40) due to the thickness of each module (component). That is, the holes 43a, 42a, and 41a are respectively formed in the centers of the cover body 43, keypad 42, and main PCB assembly 41, and modules (components) are respectively stacked by using the holes 43a, 42a, and 41a. Specifically, the stepped storage space 43d is formed on the cover body 43 and the dial body 46, the navigation key 48, and the dial wheel 49 are stacked, such that the module thickness of each component may be absorbed to some extent.

Figure 9:
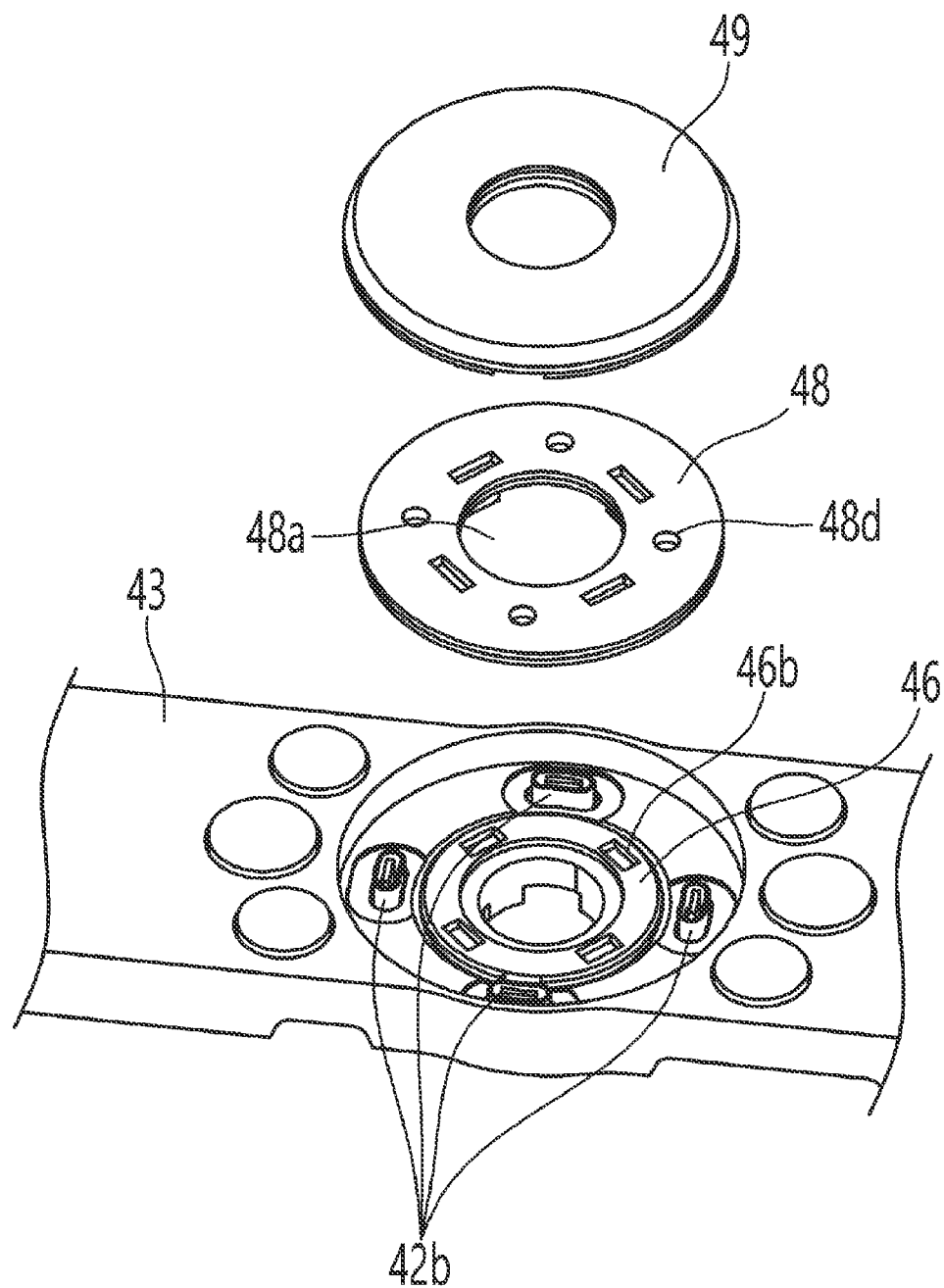
FIGS. 9 to 11 are diagrams for depicting a rotational operation of a dial wheel illustrated in FIG. 3.
Figure 10:
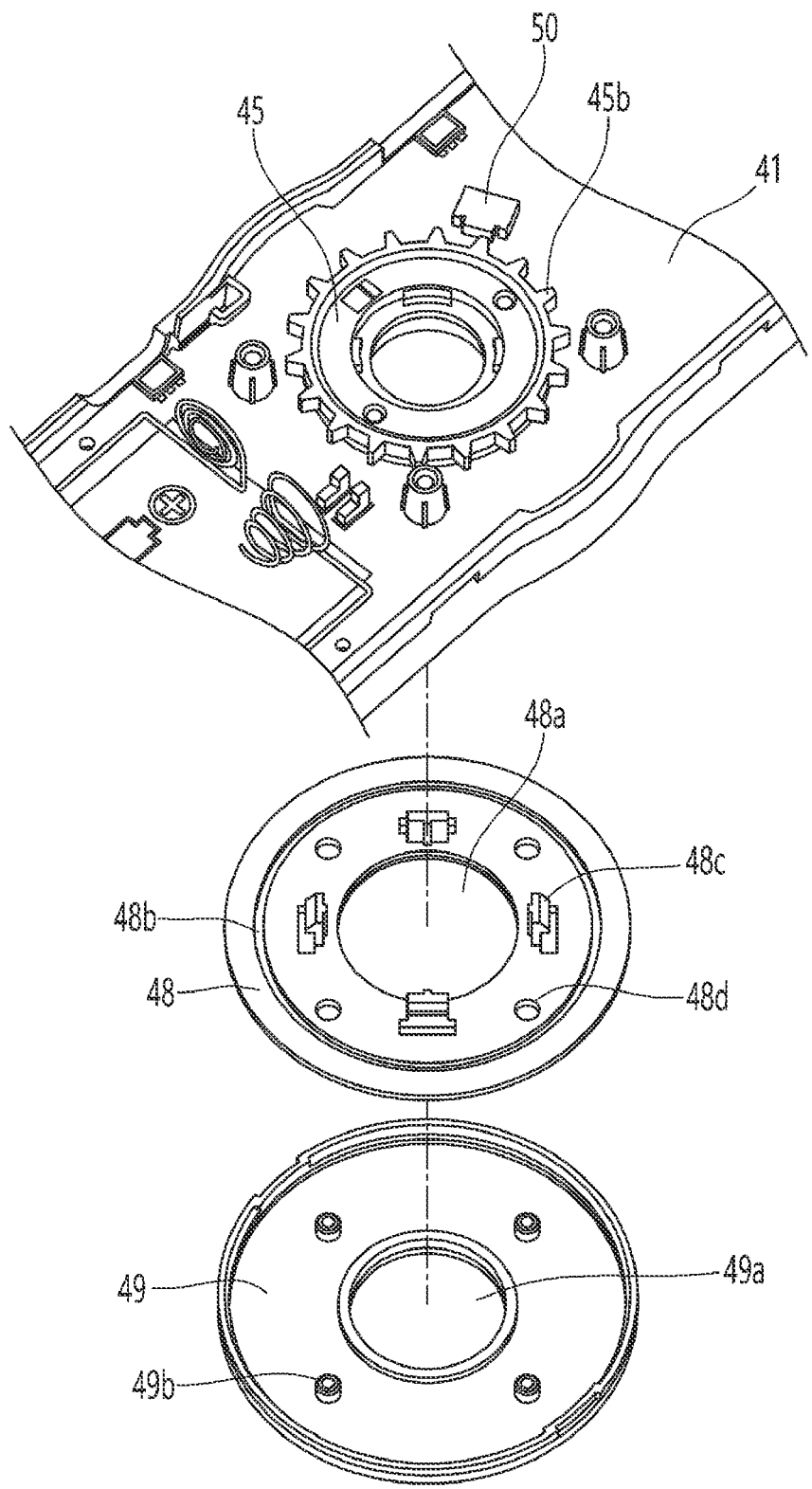
Figure 11:
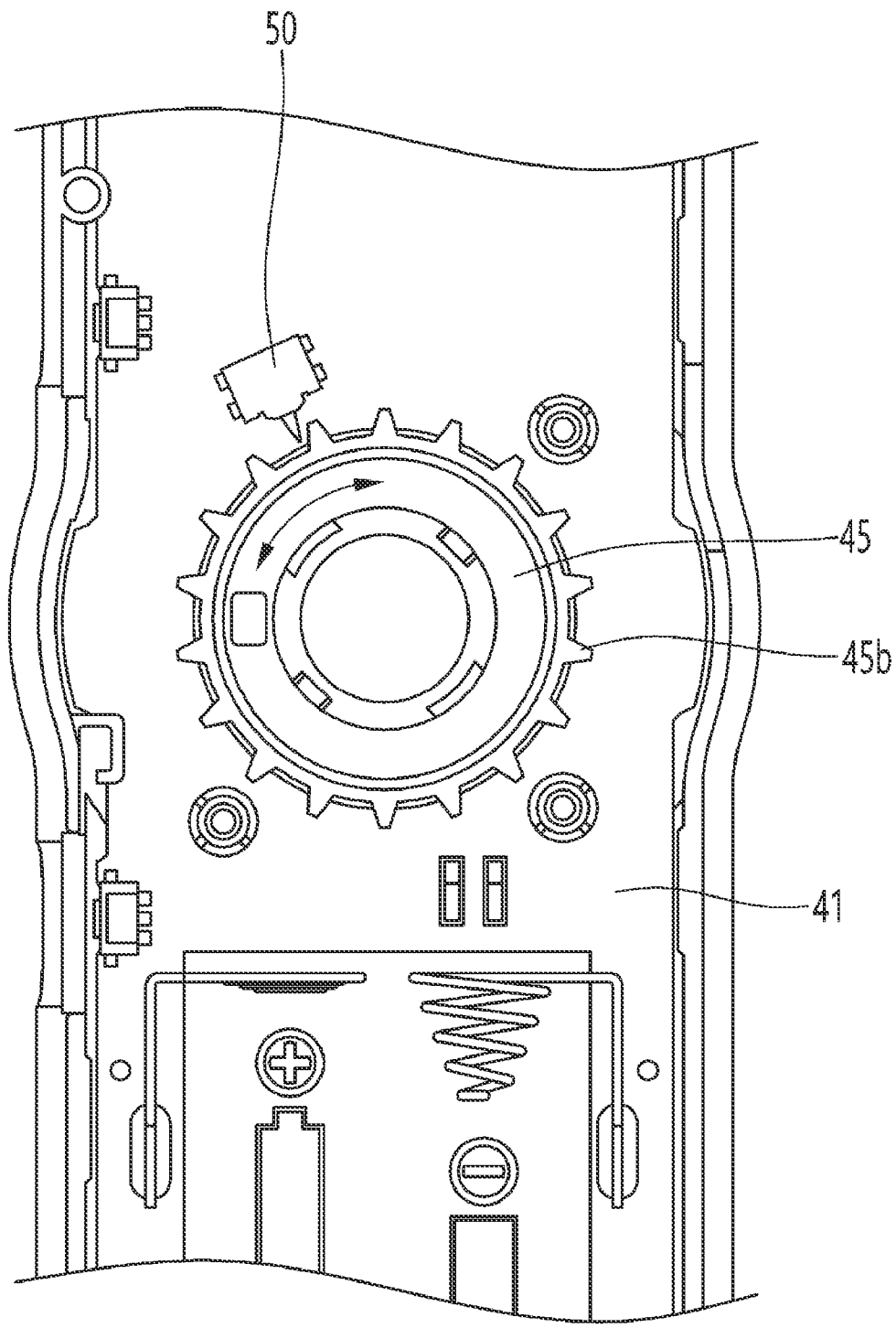

FIGS. 9 to 11 are diagrams for depicting a rotational operation of a dial wheel illustrated in FIG. 3. Illustrating the rotational operation of the dial wheel 49 in more detail.

Referring to FIGS. 9 to 11, the protrusion 49b formed on the bottom surface of the dial wheel 49 may be forcibly coupled to the hole 48d of the navigation key 48. Here, the protrusion 49b may be formed around the hole 49a of the dial wheel 49.

The coupling protrusion 48c of the navigation key 48 may be coupled to the insertion hole 46b of the dial body 46 seated on the seating portion 43c of the keypad 42. Here, the coupling protrusion 48c may be formed between adjacent holes 48d.

In addition, a detection switch 50 is installed on the other side (e.g., bottom side) of the main PCB assembly 41 to which the dial tooth wheel 45 is coupled. The detection switch 50 is installed to be able to touch the gear teeth 45b of the dial tooth wheel 45 or to be released from the gear teeth 45b of the dial tooth wheel 45.

As described above referring to FIG. 8, the dial tooth wheel 45 is coupled to the dial body 46.

Therefore, when the user rotates the dial wheel 49, the navigation key 48, dial body 46, and the dial tooth wheel 45 rotate in the same direction as the rotational direction of the dial wheel 49.

The detection switch 50 performs continuous contact and contact release with the gear teeth 45b depending on the rotation of the dial tooth wheel 45. Thus, the detection switch 50 may detect the rotational direction and rotational speed (which may be the amount of rotation) of the dial wheel 49. Although the internal structure of the detection switch 50 is not described, those skilled in the art may sufficiently understand it based on the configuration of the detection switch 50 illustrated in FIGS. 10 and 11.

The number of the gear teeth 45b formed on the dial tooth wheel 45 may be determined according to the dimensions and a desired speed of the dial wheel 49. For example, if the user wants to a faster operation of the dial wheel 49, the number of the gear teeth 45b of the dial tooth wheel 45 may be increased. Alternatively, the number of the gear teeth 45b may be increased if the outer diameter of the dial tooth wheel 45 is increased. This principle is based on the fact that when the number of gear teeth 45b increases per one rotation of the dial wheel 49, the detection switch 50 may operate at a faster speed. For example, comparing the case where there are 30 gear teeth and the case where there are 50 gear teeth, the detection switch 50 in the case with 50 gear teeth will make more contact with the gear teeth 45b compared to the case with 30 gear teeth. Thus, more contact with the gear teeth means that the detection switch 50 operates at a faster speed.

Referring to FIGS. 9 to 11, the dial wheel 49, the navigation key 48, the actuators 42b, the dial body 46, and the dial tooth wheel 45 are connected to each other.

The dial wheel 49 and the navigation key 48 are driven as a single body during rotation, and the protrusion rail 48b of the navigation key 48 rotates along with the actuators 42b. In order to reduce friction during the rotation, a lubricant or an additional component that acts as a lubricant may be added.

In addition, the navigation key 48 are coupled to the dial body 46, and the dial body 46 is connected to the dial tooth wheel 45.

When the dial tooth wheel 45 rotates in a certain direction due to the operation of the dial wheel 49, the detection switch 50 may detect the rotational direction and the rotational speed of the dial tooth wheel 45. Here, the rotational direction and the rotational speed of the dial tooth wheel 45 may be the rotational direction and the rotational speed of the dial wheel 49. Accordingly, the main PCB assembly 41 recognizes an electrical signal corresponding to the rotational direction and the rotational speed from the detection switch 50, performs electrical processing, and then, transmits a remote control signal. Of course, when transmitting the remote control signal, the main PCB assembly 41 will transmit the remote control signal at an input cycle corresponding to the rotational speed of the dial wheel 49 detected by the detection switch 50. The remote control signal may be, for example, a signal that allows quick scrolling to the desired media content among media contents aligned in one row as illustrated in FIG. 4, or a signal that allows fast movement of the desired video frame position as illustrated in FIG. 5.

In other words, when the dial wheel 49 is rotated (clockwise or counterclockwise), the detection switch 50 operates physically, allowing the main PCB assembly 41 to transmit a remote control signal to the target device (e.g., a video media playback device of a TV, an A/V device, or the like) in an input cycle corresponding to the electrical signal from the detection switch 50.

Here, even if the detection switch 50 operates physically and provides an electrical signal to the main PCB assembly 41 to transmit a remote control signal to the target device, the transmission speed of the signal may be limited depending on the communication method.

Typically, remote control signals can be transmitted 66 times per one second (approximately 15 milliseconds) through RF communication, and can be transmitted 9 times per one second (approximately 108 milliseconds) through IR communication.

That is, in the conventional IR communication, it is difficult to operate at speed faster than 108 milliseconds (approximately nine times per one second) no matter how quickly the user operates the Left/Right keys.

However, according to an embodiment of the present invention, although there is an influence by the number of gear teeth 45b when the dial wheel 49 rotates, the detection switch 50 can be operated at a faster speed when the dial wheel 49 rotates one revolution. Therefore, it is possible to transmit operation signals (i.e., remote control signals) at a faster speed than conventional IR and RF communications.

In other words, when the dial wheel 49 is rotated quickly, the detection switch 50 makes rapid and continuous contact with the gear teeth 45b. This allows for quick scrolling to the desired media content among media contents aligned in one row on the user interface screen 12 or fast movement of the video frame playback position.

As a result, the media consumer may select and control media content more quickly and intuitively. Of course, when the dial wheel 49 is rotated slowly, the detection switch 50 makes slow and continuous contact with the gear teeth 45b, allowing for slower scrolling to the desired media content among the media contents aligned in one row on the user interface screen 12 or slow movement of the video frame playback position.

Figure 12:
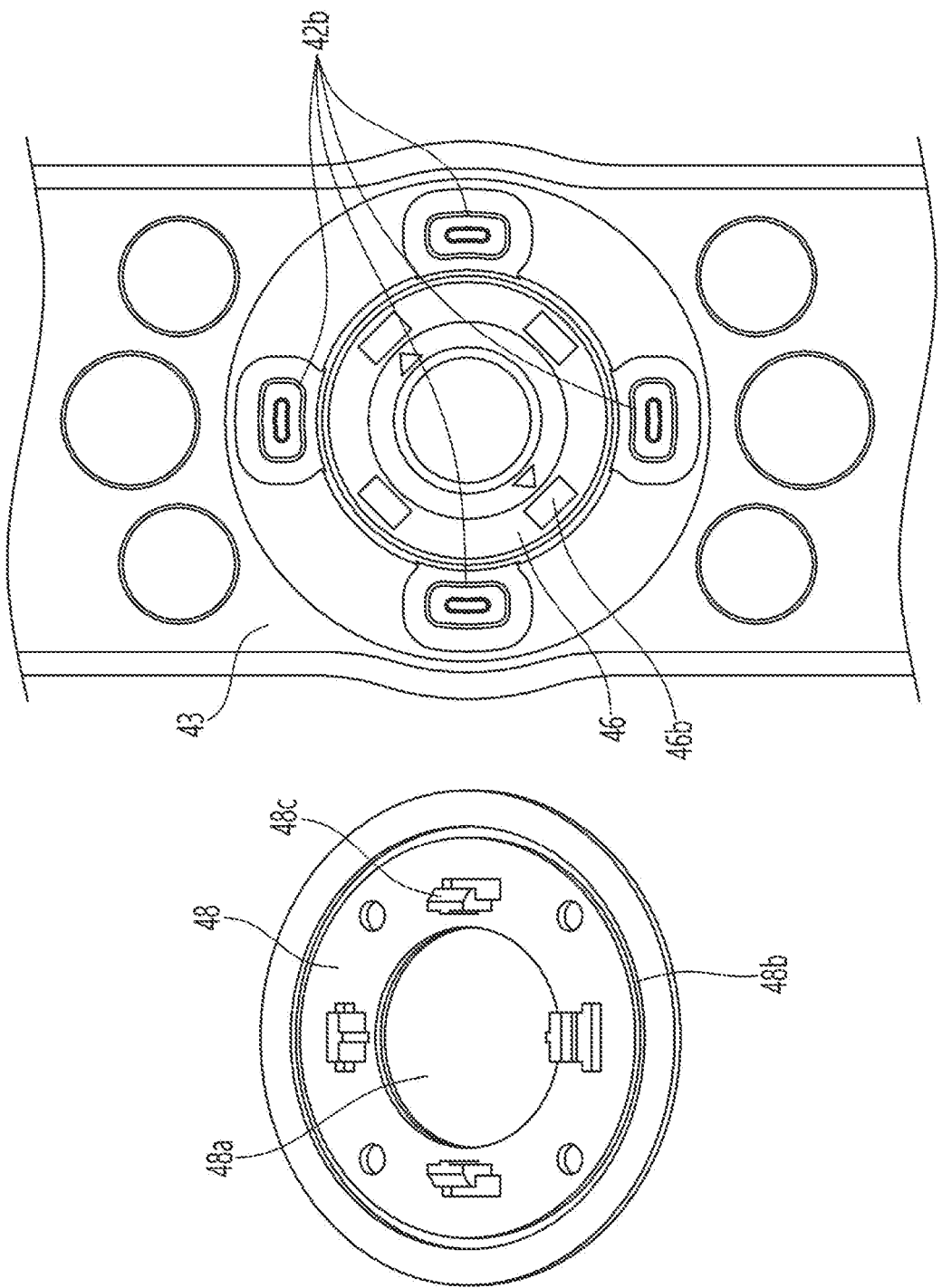
FIGS. 12 and 13 are diagrams for depicting left/right/up/down key operations of the dial wheel illustrated in FIG. 3.
Figure 13:
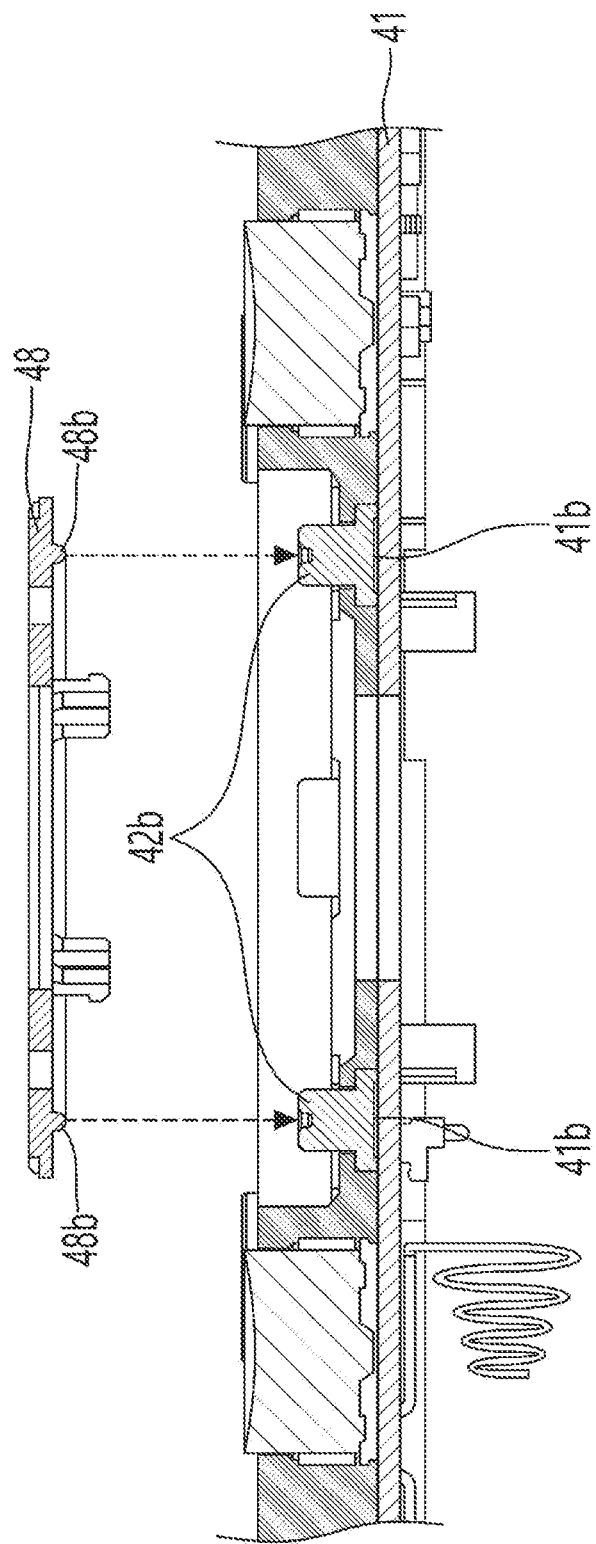

FIGS. 12 and 13 are diagrams for depicting left/right/up/down key operations of the dial wheel illustrated in FIG. 3, illustrating operations of the left/right/up/down of the dial wheel 49 in more detail.

Referring to FIGS. 12 and 13, the rail 48b of the navigation key 48 (which is protruded in a ring shape) may rotate while making contact with the upper part of the actuator 42b, and the The coupling protrusion 48c of the navigation key 48 may be coupled to the insertion hole 46b of the dial body 46 seated on the seating portion 43c of the keypad 42.

Therefore, the navigation key 48 coupled to the dial wheel 48 may perform four-directional (e.g., left/right/up/down) operations by being connected to the switches 41b of the main PCB assembly 41 through the actuators 42b of the keypad 42.

In other words, since the navigation key 48 is combined with the dial wheel 49, when the user presses the portion corresponding to one of the four directions on the dial wheel 49, the rail 48b of the navigation key 48 will activate the corresponding actuator 42b. As a result, the switch 41b facing the operated actuator 42b among the plurality of switches 41b formed on the main PCB assembly 41 is activated. The main PCB assembly 41 detects an electrical signal from the activated switch, performs electrical processing, and transmits a remote control signal (e.g., movement signal in the left/right/up/down direction) to the target device (e.g., video playback device of a TV, an A/V device, etc.).

Figure 14:
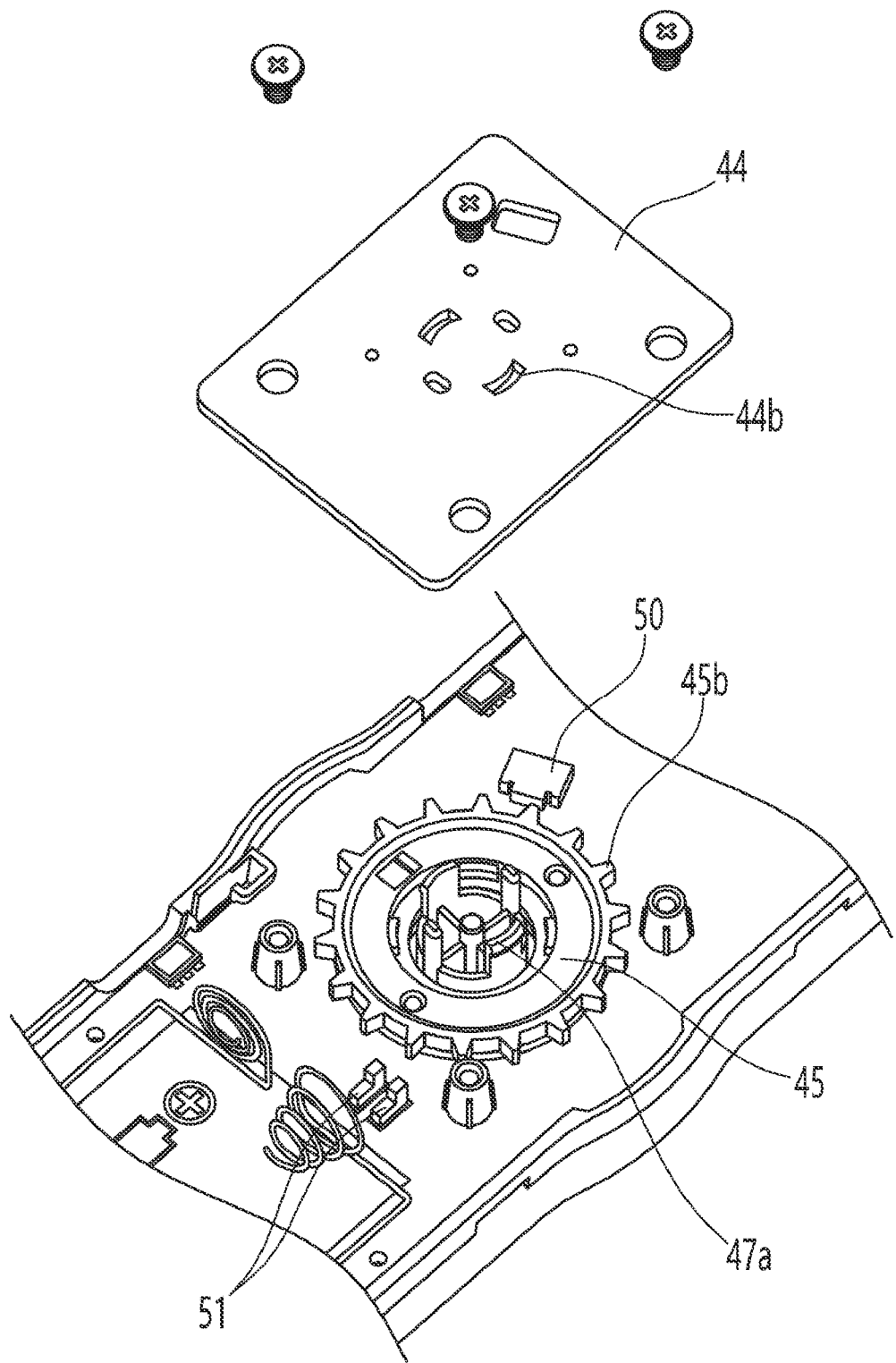
FIGS. 14 and 15 are diagrams for depicting an operation of an OK key illustrated in FIG. 3.
Figure 15:
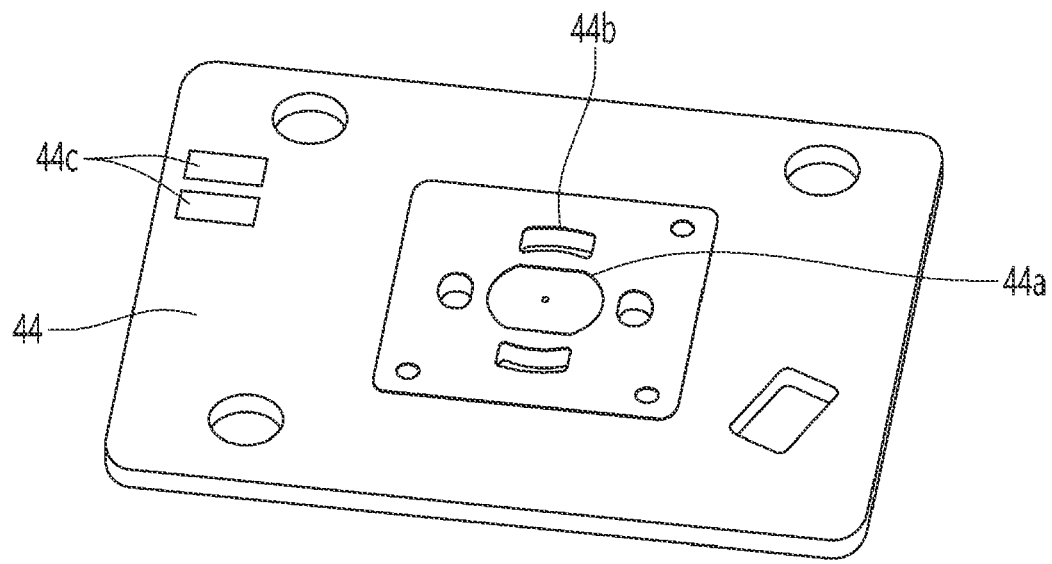

FIGS. 14 and 15 are diagrams for depicting an operation of an OK key illustrated in FIG. 3, illustrating a more detailed configuration for the operation of the OK key 47.

The OK key 47 operates independently from the dial wheel 49 and the navigation key 48.

While being inserted into the holes 49a and 48a of the dial wheel 49 and the navigation key 48, the OK key 47 operates by being connected with the subsidiary PCB assembly 44 alone separately from the dial wheel 49, and the navigation key 48.

The subsidiary PCB assembly may be fixed to the main PCB assembly 41, the keypad 42, and the cover body 43 using screws or other means.

The OK key 47 is located inside the holes 49a, 48a, 46a, 43a, 42a, 41a, and 45a respectively formed in the dial wheel 49, the navigation key 48, the dial body 46, the cover body 43, the keypad 42, the main PCB assembly 41, and the dial tooth wheel 45.

The subsidiary PCB assembly 44 and the OK key 47 are connected in a hook-like manner, ensuring that they remain securely attached and not easily detached.

A switch 44a is formed in the center of the subsidiary PCB assembly 44, and a protrusion is formed in the center of the OK key 47 to apply force to the switch 44a.

Accordingly, when the user presses the OK key 47, the OK key 47 operates independently, activating the switch 44a in the center of the subsidiary PCB assembly 44. The subsidiary PCB assembly 44 detects the electrical signal by the operation of the switch 44a, and sends the electrical signal to the main PCB assembly 41. Then, the main PCB assembly 41 generates a remote control signal based on the processing signal from the subsidiary PCB assembly 44, and transmits it to the target device (e.g., the image playback device of the TV, A/V, or the like) for control.

Here, the subsidiary PCB assembly 44 is connected to the main PCB assembly 41 capable of processing overall signals. For this purpose, the subsidiary PCB assembly 44 may be equipped with contact spring pads 44c for electrical connection with the main PCB assembly 41, and the main PCB assembly 41 may have contact spring terminals 51. The electrical connection between the main PCB assembly 41 and the subsidiary PCB assembly 44 is established by the contact between the contact spring pads 44c and the contact spring terminals 51.

If the main PCB assembly 41 and the subsidiary PCB assembly 44 are connected through the dial tooth wheel 45, the contact spring pads 44c and the contact spring terminals 51 may make contact with each other. Of course, the subsidiary PCB assembly 44 and the main PCB assembly 41 may be connected to each other through means other than contact springs, such as cables or FPCBs.

In the described above, the holes 41a may be an example of the first hole as claimed in the present invention, and the holes 45a may be an example of the second hole as claimed. Furthermore, the holes 46a may be an example of the third hole as claimed, and the holes 49a may be an example of the fourth hole as claimed. Additionally, the holes 42a may be an example of the fifth hole as claimed, and the holes 43a may be an example of the sixth hole as claimed. The holes 48a may be an example of the seventh hole as claimed, and the holes 48d may be an example of the eighth hole as claimed.

As described above, the switches 41b may be an example of the first switch as claimed in the present invention, and the switches 44a may be an example of the second switch as claimed.

Furthermore, in the described explanation, the insertion holes 46b may be an example of the first insertion hole as claimed in the present invention, and the actuator insertion holes 43b may be an example of the second insertion hole as claimed. The insertion holes 44b may be an example of the third insertion hole as claimed.

As described above, the protrusion 49b may be an example of the first coupling member as claimed in the present invention, and the coupling protrusion 48c may be an example of the second coupling member as claimed.

Figure 16:
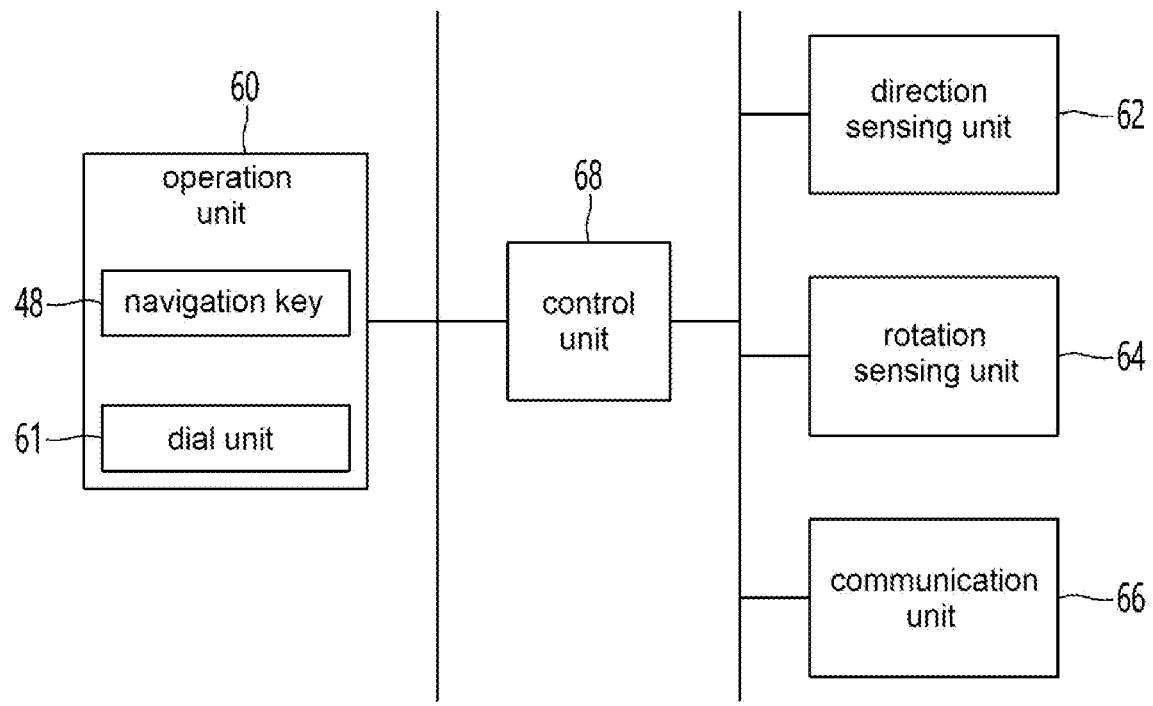
FIG. 16 is a block diagram of the input device according to an embodiment of the present invention.

The input device according to an embodiment of the present invention may be software-expressed and may include components as illustrated in FIG. 16.

In FIG. 16, the input device (e.g., remote controller) according to an embodiment of the present invention may include an operation unit 60, a direction sensing unit 62, a rotation sensing unit 64, a communication unit 66, and a control unit 68.

The operation unit 60 includes the navigation key 48 and the dial unit 61, and may take charge of direction selection and rotation of the dial wheel 49.

In other words, the operation unit 60 may perform a key input to quickly move media contents aligned in one row of the user interface screen to the left or right, to move to media contents placed in the upper or lower rows, or to quickly move the playback position of video frames.

As described above, the navigation key 48 is operated when selecting any direction among the four directions (e.g., up, down, left, right).

As described above, the navigation key 48 is coupled with the dial wheel 49 and the dial body (4), comes into contact with the actuator 42*b*.

The dial unit 61 may include the cover body 43, the dial tooth wheel 45, the dial body 46, and the dial wheel 49. As described above, the cover body 43, the dial tooth wheel 45, the dial body 46, and the dial wheel 49 are interconnected in a stacked structure along with the navigation key 48.

In particular, since the dial tooth wheel 45, the dial body 46, the navigation key 48, and the dial wheel 49 are directly connected to each other, when the user manipulates the operation unit 60 (e.g., rotating clockwise or counterclockwise), the dial tooth wheel 45, the dial body 46, the navigation key 48, and the dial wheel 49 rotate together in the same direction.

The cover body 43, the dial tooth wheel 45, the dial body 46, and the dial wheel 49 may be assembled in a stacked structure, and after assembly, only the topmost dial wheel 49 is visible. Therefore, when viewed from the exterior, it appears that the dial wheel 49 is rotated in the clockwise direction or in the counterclockwise direction. Additionally, when viewed from the exterior, the key operation of the navigation key 48 is not visible, so it may be understood that selecting one of the four directions by pressing the position indicating the direction on the dial wheel 49 corresponds to choosing the corresponding direction among the left, right, up, and down directions.

Meanwhile, the operation unit 60 may include the OK key 47 in addition to the navigation key 48 and the dial unit 61.

The direction sensing unit 62 may detect which direction (e.g., up, down, left, or right direction) is selected (clicked) as the navigation key 48 is operated.

Actually, although the navigation key 48 is positioned below the dial wheel 49 and cannot be visually observed, the direction sensing unit 62 may detect which direction (e.g., up, down, left, right) corresponds to the area pressed on the dial wheel 49.

For example, the direction sensing unit 62 may include the actuator 42*b* and the switch 41*b*.

The rotation sensing unit 64 may detect the rotational direction and the rotational speed of the dial wheel 49 when it rotates in one direction.

For example, the rotation sensing unit 64 may include a detection switch 50.

In FIG. 16, the direction sensing unit 62 and the rotation sensing unit 64 are illustrated as separate units for convenience. However, if necessary, they may be considered as a single unit capable of detecting both direction and rotation (referred to as a direction and rotation sensing unit). Therefore, the direction and rotation sensing unit may detect one or more among the direction selected by the navigation key 48 and the rotation caused by the dial unit 61.

The communication unit 66 may transmit the remote control signal generated from the control unit 68 to the target device (e.g., the video playback device of the TV, the A/V device, or the like) based on the detection signals from the direction sensing unit 62 and rotation sensing unit 64. In this instance, the communication unit 66 may transmit the remote control signal using RF communication or IR communication.

The control unit 68 controls the overall operation of the input device (e.g., remote controller) according to an embodiment of the present invention.

Based on the detection signals from the direction sensing unit 62 and rotation sensing unit 64, the control unit 68 generates the remote control signal and transmits it to the communication unit 66. Accordingly, the communication unit 66 may transmit the remote control signal to the target device (e.g., the video playback device of the TV, the A/V device, or the like).

Therefore, the control unit 68 controls the movement on the user interface screen of the target device based on at least one of the direction input corresponding to the navigation key 48 and the rotation input from the dial unit 61.

For example, the control unit 68 may control the selection movement between media contents aligned in rows or columns on the user interface screen on video media of the target device based on at least one of the direction input corresponding to the navigation key 48 and the rotation input from the dial wheel 49.

Moreover, the control unit 68 may scroll the media contents, which are aligned in rows or columns on the user interface screen, in the rotational direction of the dial wheel 49 by sending a remote control signal to the video medium in the input cycle corresponding to the rotational speed of the dial wheel 49. In this instance, the scroll speed may be determined by the input cycle corresponding to the rotational speed of the dial wheel 49.

Furthermore, the control unit 68 may move the playback position of video frames at a speed determined by the input cycle with respect to the rotational direction of the dial wheel 49 by sending a remote control signal to the video medium in the input cycle corresponding to the rotational speed of the dial wheel 49.

Moreover, the control unit 68 may also control the row movement or the column movement of the media contents in the matrix structure on the user interface screen based solely on the direction selected by the navigation key 48, independently from the rotation input of the dial wheel 49.

To perform these operations, the control unit 68 may include the main PCB assembly 41 and the subsidiary PCB assembly 44.

In other words, the control unit 68 may generate a remote control signal in the input cycle corresponding to the rotation detection speed in the rotation sensing unit 64 generated based on the rotation of the dial wheel 49 and transmit it to the target device. Consequently, if the dial wheel 49 is rapidly rotated in one direction, the media contents aligned in one row on the user interface screen 12 of the target device may be scrolled quickly in the corresponding direction, or the playback position of the video frame of a single media content displayed on the user interface screen 12 may be moved rapidly in the corresponding direction by the rapid input cycle.

That is, the control unit 68 may control the movement of media contents aligned in rows on the user interface screen and the movement of the playback position of the video frame based on the operation of the dial wheel 49. Accordingly, the control unit 68 may move the media contents aligned in the row on the user interface screen in the rotational direction of the dial wheel 40 by sending a remote control signal to the target device having the input cycle of the speed corresponding to the rotational speed of the dial wheel 49. Meanwhile, the control unit 68 may move the playback position of the video frame in the rotational direction of the dial wheel 40 by sending a remote control signal to the target device having the input cycle of the speed corresponding to the rotational speed of the dial wheel 49.

Furthermore, when the navigation key 48 is operated for row movement of the media contents in the matrix structure displayed on the user interface screen 12 (i.e., when the position corresponding to the up or down direction on the dial wheel 49 is pressed), the control unit 68 may generate a remote control signal based on the direction detection of the direction sensing unit 62 according to the operation of the navigation key 48, and transmit the signal to the target device. As a result, the row movement of the media contents of the matrix structure displayed on the user interface screen 12 of the target device is performed. In contrast, when the position corresponding to the left or right direction on the dial wheel 49 is pressed, the control unit 68 performs control in the usual manner. In other words, based solely on the direction selected by input of the navigation key 48, the control unit 68 may further control the column movement or the row movement of the media contents of the matrix structure on the user interface screen can be controlled.

Of course, if necessary, the communication unit 66 may be included in the control unit 68.

As described above, the best embodiments have been disclosed in the drawings and specification. Specific terms have been used for the purpose of describing the present invention, but they were used merely for the purpose of describing the invention and not to limit the scope of the invention as defined in the claims. Therefore, those skilled in the art will understand that various modifications and equivalent embodiments are possible based on common knowledge in the technical field. Thus, the true scope of protection of the present invention should be determined by the technical idea of the appended claims.

The invention claimed is:

1. An input device comprising:
   a navigation key manipulated to select one direction among a plurality of directions;
   a dial unit including a rotating dial wheel; and
   a control unit which controls movement on a user interface screen of a target device based on one or more direction inputs corresponding to the navigation key and a rotation operation input of the dial wheel,
   wherein the navigation key and the dial wheel are coupled with each other in a stacked structure, and
   wherein the control unit further controls a row movement or a column movement of media contents in a matrix structure on the user interface screen based solely on the direction selected by the navigation key, independently from the rotation operation input of the dial wheel.

2. The input device according to claim 1, wherein the control unit controls selection movement between media contents aligned in rows or columns on the user interface screen based on at least one among one or more direction inputs corresponding to the navigation key and the rotation operation input of the dial wheel.

3. The input device according to claim 2, wherein the control unit transmits remote control signals to the target device in an input cycle corresponding to the rotational speed of the dial wheel, and scrolls media contents aligned in rows or columns on the user interface screen at a speed corresponding to the input cycle with respect to the rotational direction of the dial wheel.

4. The input device according to claim 2, wherein the control unit transmits remote control signals to the target device in an input cycle corresponding to the rotational speed of the dial wheel, and moves a playback position of a video frame at a speed corresponding to the input cycle with respect to the rotational direction of the dial wheel.

5. The input device according to claim 1, wherein the dial unit comprises:
   a dial tooth wheel which is installed on one side of the main PCB assembly where a plurality of first switches for direction detection are installed around a first hole, and which has a second hole and a plurality of gear teeth formed on the outer surface thereof;
   a dial body which has a third hole and a first insertion hole formed around the third hole; and
   the dial wheel which has a fourth hole and which is coupled with the navigation key through a first coupling member,
   wherein the dial body, the navigation key, and the dial wheel are stacked on a cover body installed on the other side of the main PCB assembly by the medium of a key pad having a plurality of actuators formed around a fifth hole.

6. The input device according to claim 5, wherein the cover body includes a storage space in which the dial body, the navigation key, and the dial wheel are stacked, and
   wherein the storage space has a sixth hole formed in the center, and a seating portion formed adjacent to the edge of the sixth hole, and a second insertion hole which is formed around the seating portion for inserting the actuators thereinto, wherein the seating portion is stepped so as to be located lower than the portion where the second insertion hole is formed.

7. The input device according to claim 6, wherein the dial body is seated on the seating portion,
   wherein the navigation key is stored in the portion where the second insertion hole is formed, and
   wherein the dial wheel is stacked on the upper portion of the navigation key.

8. The input device according to claim 6, wherein the navigation key includes a seventh hole formed, an eighth hole formed around the seventh hole for coupling with the first coupling member of the dial wheel, a second coupling member formed on one side to be coupled to the first insertion hole of the dial body, and a rail formed on the one side to get in contact with the actuator exposed through the second insertion hole of the cover body.

9. The input device according to claim 8, wherein when a portion representing a specific direction on the dial wheel is pressed, the rail operates the actuator corresponding to the pressed portion, and the operated actuator actuates the switch responsible for the corresponding direction among the plurality of first switches.

10. The input device according to claim 8, wherein the rail protrudes in a ring shape, and rotates along with the actuator exposed through the second insertion hole depending on the rotation of the dial wheel.

11. The input device according to claim 8, further comprising:
    a subsidiary PCB assembly which is coupled to one side of the main PCB assembly through the dial tooth wheel, and has a second switch formed on one side and a third insertion hole formed around the second switch.

12. The input device according to claim 11, further comprising:
    an OK key,
    wherein the OK key is coupled to the third insertion hole of the subsidiary PCB assembly through the first to seventh holes, and is installed to get in contact with the second switch.

13. The input device according to claim 6, wherein the first switch is a plurality of switches formed around the ninth hole of the main PCB assembly to be spaced apart from each other, and wherein the plurality of switches and the plurality of actuators face each other one to one to get in mutual contact with each other.

14. The input device according to claim 13, wherein the dial tooth wheel is coupled to the dial body through the ninth hole, the sixth hole, and the fifth hole.

15. The input device according to claim 5, further comprising:

a detection switch which detects the rotational speed of the dial wheel by performing continuous contact and contact release with the plurality of gear teeth depending on the rotation of the dial tooth wheel.

16. An input device comprising:

a navigation key manipulated to select one direction among a plurality of directions; and a dial unit including a rotating dial wheel, wherein the dial unit comprises:

a dial tooth wheel which is installed on one side of the main PCB assembly where a plurality of first switches for direction detection are installed around a first hole, and which has a second hole and a plurality of gear teeth formed on the outer surface thereof;

a dial body which has a third hole and a first insertion hole formed around the third hole; and the dial wheel which has a fourth hole and which is coupled with the navigation key through a first coupling member, and wherein the dial body, the navigation key, and the dial wheel are stacked on a cover body installed on the other side of the main PCB assembly by the medium of a key pad having a plurality of actuators formed around a fifth hole.

17. The input device according to claim 16, wherein the cover body includes a storage space in which the dial body, the navigation key, and the dial wheel are stacked, and wherein the storage space has a sixth hole formed in the center, and a seating portion formed adjacent to the edge of the sixth hole, and a second insertion hole which is formed around the seating portion for inserting the actuators thereinto, wherein the seating portion is stepped so as to be located lower than the portion where the second insertion hole is formed.

18. The input device according to claim 17, wherein the dial body is seated on the seating portion, wherein the navigation key is stored in the portion where the second insertion hole is formed, and wherein the dial wheel is stacked on the upper portion of the navigation key.

19. The input device according to claim 17, wherein the navigation key includes a seventh hole formed, an eighth hole formed around the seventh hole for coupling with the first coupling member of the dial wheel, a second coupling member formed on one side to be coupled to the first insertion hole of the dial body, and a rail formed on the one side to get in contact with the actuator exposed through the second insertion hole of the cover body.

\* \* \* \* \*